US006990676B1

(12) United States Patent
Proehl et al.

(10) Patent No.: US 6,990,676 B1
(45) Date of Patent: Jan. 24, 2006

(54) LOCALLY STORED CONTENT PREVIEWS, REPRESENTATIVE OF PROGRAMMING CONTENT IN AN ELECTRONIC PROGRAMMING GUIDE THROUGH A GRAPHIC IMAGE ACCESSED FROM THE HARD DRIVE OF A SET TOP BOX

(75) Inventors: Andy Proehl, New York, NY (US); Kim Mingo, Brooklyn, NY (US)

(73) Assignees: Sony Corporation, Tokyo (JP); SDI Development Inc., Burbank, CA (US)

( * ) Notice: Subject to any disclaimer, the term of this patent is extended or adjusted under 35 U.S.C. 154(b) by 0 days.

(21) Appl. No.: 09/271,028

(22) Filed: Mar. 17, 1999

(51) Int. Cl.
*G06F 3/00* (2006.01)
*G06F 13/00* (2006.01)
*H04N 5/445* (2006.01)

(52) U.S. Cl. ............... 725/40; 725/51; 725/61
(58) Field of Classification Search ............... 725/39, 725/40, 41, 43, 44, 47, 51, 61, 110, 112, 37, 725/38, 42, 55, 63, 64, 68, 109, 113, 114, 725/131, 133, 134, 66, 65, 53; G06F 3/00, G06F 13/00; H04N 5/445, 7/16, 7/173
See application file for complete search history.

(56) References Cited

U.S. PATENT DOCUMENTS

| | | | |
|---|---|---|---|
| 5,751,282 A | | 5/1998 | Girard et al. |
| 5,758,259 A | * | 5/1998 | Lawler ........................ 725/45 |
| 5,815,145 A | | 9/1998 | Matthews, III |
| 5,818,441 A | * | 10/1998 | Throckmorton et al. .... 345/717 |
| 5,844,552 A | | 12/1998 | Gaughan et al. |
| 5,850,218 A | | 12/1998 | LaJoie et al. |
| 6,025,837 A | * | 2/2000 | Matthews, III et al. ..... 725/110 |
| 6,028,600 A | * | 2/2000 | Rosin et al. ................ 345/327 |
| 6,075,526 A | * | 6/2000 | Rothmuller .................. 725/53 |
| 6,169,543 B1 | * | 1/2001 | Wehmeyer ................... 725/47 |

* cited by examiner

*Primary Examiner*—Vivek Srivatava
(74) *Attorney, Agent, or Firm*—Thomas F. Lebens; Fitch, Even, Tabin & Flannery

(57) ABSTRACT

An integrated DSS/WebTV receiver is communicatively connected to an Internet service provider, a DSS service provider, and (optionally) a local broadcast station to provide a display of DSS programs, Internet web sites, and local broadcast channels in a seamless fashion. The DSS/WebTV receiver downloads graphic images, corresponding to DSS programs, from a DSS communication medium or the Internet into a local memory. The graphic images are periodically updated by the DSS service provider or Internet service provider. The DSS/WebTV receiver generates a graphical user interface (GUI), displayed on a television screen, for facilitating a user's navigation through the DSS, Internet, and local broadcast data. The GUI includes a selectable DSS program listing that displays DSS programs that are currently being broadcast or that will be broadcasted in the future. If a user selects a currently broadcasted program, the DSS/WebTV receiver displays the selected program on the television. If the user selects a program that is broadcasted in the future, the DSS/WebTV receiver displays a downloaded graphic image, corresponding to the selected program, on the television. The graphic image may be the selected program's name or logo, still shots from the selected program, short video clips related to the selected program, or advertisements related to the selected program.

58 Claims, 20 Drawing Sheets

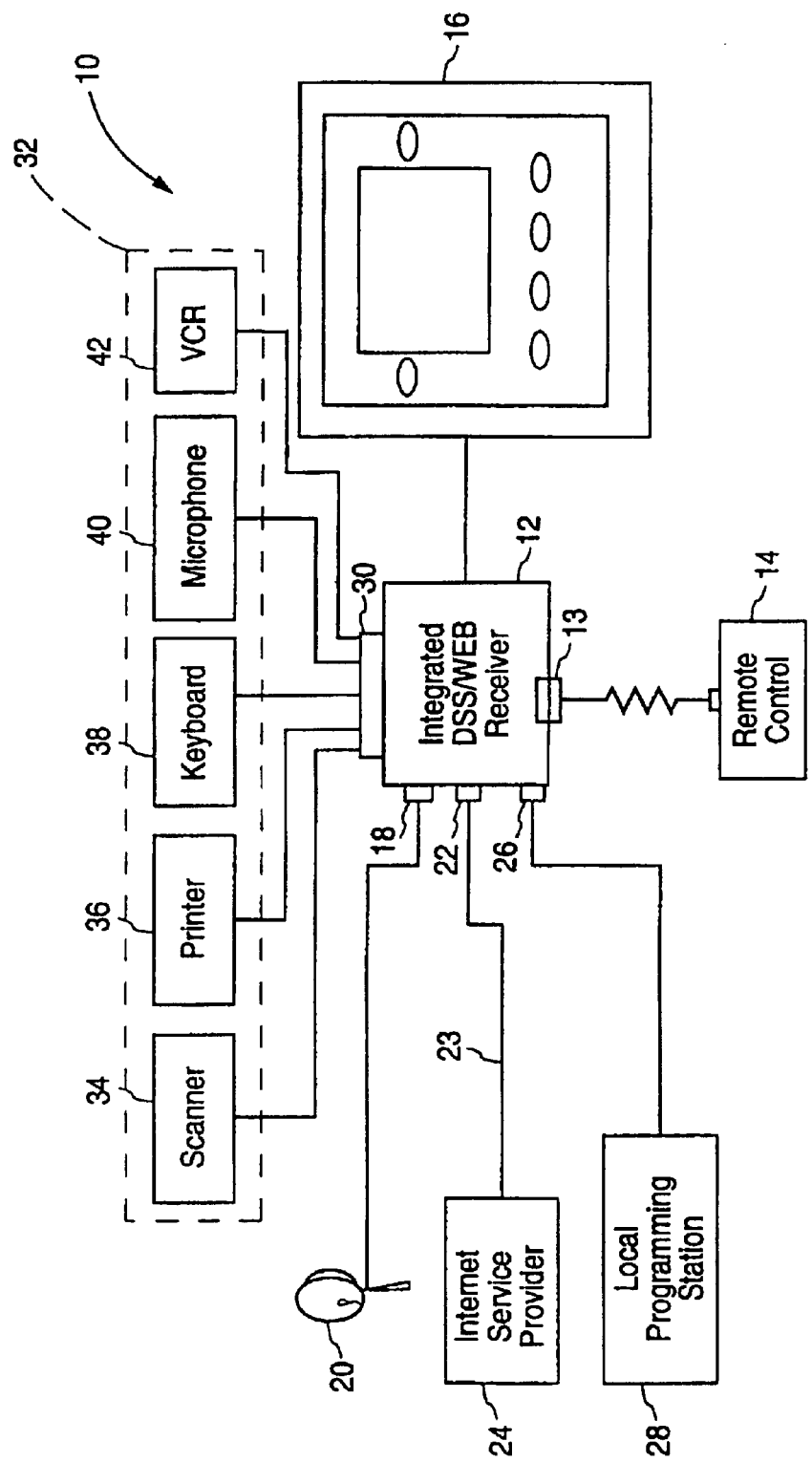

LOCALLY STORED CONTENT PREVIEWS, REPRESENTATIVE OF PROGRAMMING CONTENT IN AN ELECTRONIC PROGRAMMING GUIDE THROUGH A GRAPHIC IMAGE ACCESSED FROM THE HARD DRIVE OF A SET TOP BOX

BACKGROUND OF THE INVENTION

1. Field of the Invention

The present invention relates generally to the presentation of Internet data and DSS programs, and more specifically to the presentation of a graphic image, downloaded from the Internet or a DSS communication medium, if a selected DSS program is to be broadcasted in the future.

2. Related Art

Over the last few years there has been a growing demand for entertainment systems that facilitate a user's ability to access multiple broadcast, information, and entertainment mediums. One type of broadcast medium is a broadcast satellite system such as a digital satellite system (DSS). DSS typically includes an antenna, an integrated receiver decoder (IRD), a television receiver (TV), and a remote controller. DSS may additionally include an analog video cassette recorder (VCR) that receives analog data for recording purposes.

In operation, the antenna receives digital bit streams from a satellite and routes the bit streams to the IRD. Typically, the digital bit streams include sensory data (e.g., video and/or audio) and programming data for one or more shows. The IRD receives the bit streams from the antenna and decodes the bit streams into data that can be presented to a user via the TV. The user selects which portion of the decoded data is transmitted from the IRD to the TV through actuation of the remote controller.

One type of information and entertainment medium is the Internet. The Internet may be accessed by a user through an Internet terminal system such as a WebTV Plus system. The WebTV Plus system typically includes a TV, an Internet terminal interconnecting the TV to the user's phone line and the user's cable line, and a remote controller that can be actuated by the user to control what information is presented on the TV by the Internet terminal. In addition, the WebTV Plus system may also include a wireless keyboard and a printer.

In operation, the Internet terminal receives cable-based broadcasts from the user's cable service provider via the user's cable line and receives Internet data from the user's Internet service provider via the user's phone line. The user selects how the received information is displayed on the TV through actuation of the remote controller.

Currently there exists a need for an integrated DSS/Internet system that permits a user to view DSS programs, local cable-based and/or terrestrial-based programs, and Internet data in a seamless fashion. Furthermore, there is a need for an integrated DSS/Internet system that displays a program-related graphic image if a user selects a DSS program that is to be broadcast in the future. Moreover, there is a need for an integrated DSS/Internet system that downloads and periodically updates program-related graphic images from the Internet or DSS communication medium.

SUMMARY OF THE INVENTION

To address the shortcomings of the available art, the present invention provides an integrated DSS/WebTV receiver that is communicatively connected to an Internet service provider, a DSS service provider, and (optionally) a local broadcast station to provide a display of DSS programs, Internet web sites, and local broadcast channels in a seamless fashion. The DSS/WebTV receiver downloads graphic images, corresponding to DSS programs, from a DSS communication medium or the Internet into a local memory. The graphic images are periodically updated by the DSS service provider or Internet service provider. The DSS/WebTV receiver generates a graphical user interface (GUI), displayed on a television screen, for facilitating a user's navigation through the DSS, Internet, and local broadcast data. The GUI includes a selectable DSS program listing that displays DSS programs that are currently being broadcast or that will be broadcasted in the future. If a user selects a currently broadcasted program, the DSS/WebTV receiver displays the selected program on the television. If the user selects a program that is broadcasted in the future, the DSS/WebTV receiver displays a downloaded graphic image, corresponding to the selected program, on the television. The graphic image may be the selected program's name or logo, still shots from the selected program short video clips related to the selected program, or advertisements related to the selected program.

In one advantageous feature of the present invention, an apparatus is provided for displaying information to a user via a television. The apparatus includes a digital satellite system (DSS) processing element communicatively connected to a satellite communication medium for receiving a program that is broadcasted over the satellite communication medium, a computer readable medium for storing a graphic image, the graphic image corresponding to the program that is broadcasted over the satellite communication medium, and an Internet processing element communicatively connected to the Internet for transmitting and receiving data over the Internet, communicatively connected to the DSS processing element for receiving the program from the DSS processing element, communicatively connected to the computer readable medium for retrieving the graphic image from the computer readable medium, and communicatively connected to the television for displaying the data received from the Internet and one of the program and the graphic image on the television, the Internet processing element displaying the program on the television if the DSS processing element has received the program from the satellite communication medium, the Internet processing element displaying the graphic image on the television if the DSS processing element has not received the program from the satellite communication medium.

In another advantageous feature of the present invention, a method of displaying information to a user via a television is provided. The method includes the steps of receiving a program when it is broadcasted over a satellite communication medium, storing a graphic image related to the program in a computer readable medium, and displaying the graphic image on the television if a request for the program is received before the program is broadcasted over the satellite communication medium.

In a further advantageous feature of the invention, an apparatus is provided for displaying information to a user via a television. The apparatus includes circuitry for receiving a program when it is broadcasted over a satellite communication medium, circuitry for storing a graphic image related to the program in a computer readable medium; and circuitry for displaying the graphic image on the television if a request for the program is received before the program is broadcasted over the satellite communication medium.

BRIEF DESCRIPTION OF THE DRAWINGS

The aforementioned features and advantages of the present invention as well as additional advantages thereof will be more readily understood upon consideration of the following detailed description of a preferred embodiment of the invention when taken in conjunction with the following drawings.

FIG. 1 is a diagrammatic view of an entertainment system utilizing the present invention.

DETAILED DESCRIPTION OF THE PREFERRED EMBODIMENTS

Figure 2A:
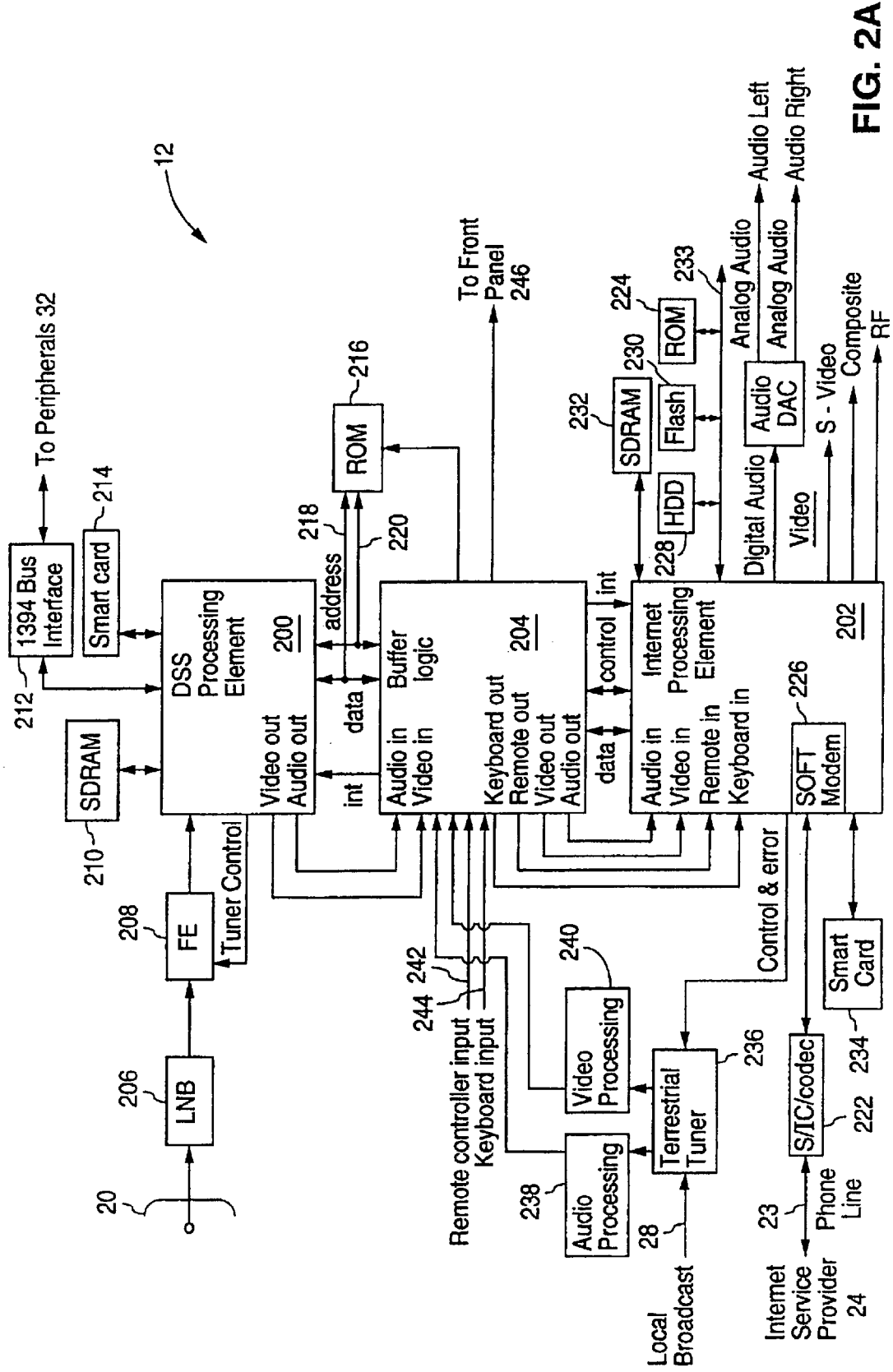
FIGS. 2A–2C are diagrammatic views of one embodiment of the integrated DSS/WebTV receiver used in the entertainment system of FIG. 1.

In the method and apparatus of the present invention the satellite broadcast system is described as a direct broadcast satellite system (DSS) and the Internet terminal system is described as WebTV. However, it is readily apparent to one skilled in the art that other integrated systems that can receive and display satellite and Internet data may utilize the method and apparatus of the present invention. Furthermore, in the following description, for purposes of explanation, numerous details are set forth, such as menus, flowcharts and system configurations, in order to provide a thorough understanding of the present invention. However, it will be apparent to one skilled in the art that these specific details are not required in order to practice the invention. In other instances, well known electrical structures and circuits are shown in block diagram form in order not to unnecessarily obscure the present invention.

Referring now to FIG. 1, an exemplary embodiment of an entertainment system 10 utilizing the present invention is shown. Entertainment system 10 includes an integrated DSS/WebTV receiver 12, a remote controller 14, and a display monitor such as a television receiver (TV) 16. Integrated receiver 12 includes an input port 18 that receives broadcast signals from a DSS antenna 20, an I/O port 22 that receives Internet data over a telephone line 23 from an Internet service provider 24, an input port 26 that receives broadcast signals from a local programming station 28 (e.g., a local cable station), and an infrared receiver 13 for receiving infrared signals from the remote controller 14. Integrated receiver 12 also includes peripheral I/O ports 30 that communicate with a plurality of peripheral devices 32. Peripheral devices 32 include, but are not limited to, a scanner 34, a printer 36, a keyboard 38, a microphone 40, and a recording device 42 such as video cassette recorder (VCR).

In operation, integrated receiver 12 receives a broadcast signal (e.g., a digital bit stream from DSS antenna 20 or analog data from local programming station 28) and performs operations (e.g., demodulating and/or decoding routines) on the broadcast signal to produce video and audio information to be displayed to the user via TV 16. Integrated receiver 12 also receives Internet signals from Internet service provider 24 and performs operations (e.g., decompressing and/or decoding routines) on the Internet signals to produce video and audio information to be displayed to the user via TV 16. The user controls the display of the Internet-derived and broadcast-derived audio and video information using remote controller 14, as discussed in further detail below.

Figure 2B:
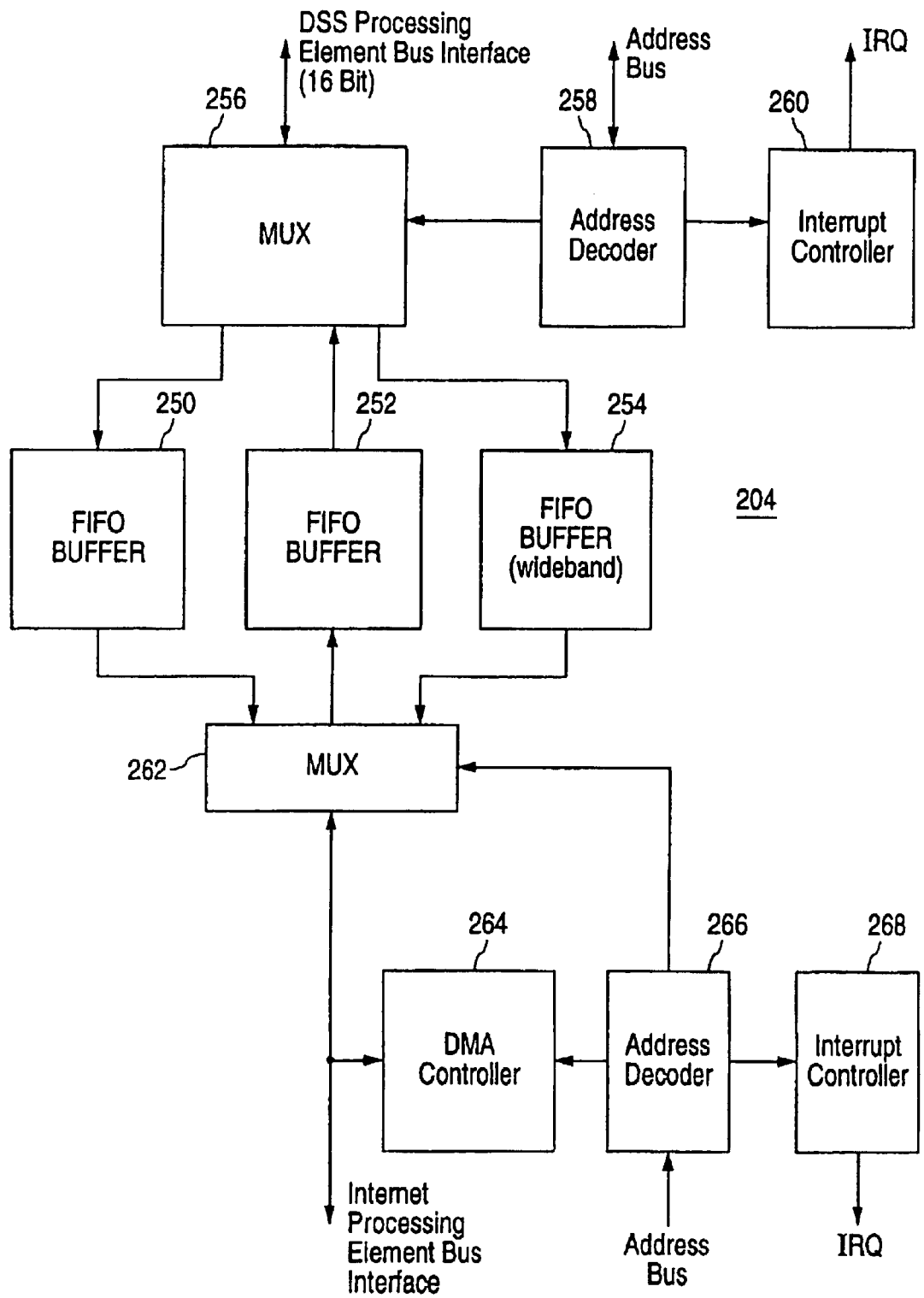
Figure 2C:
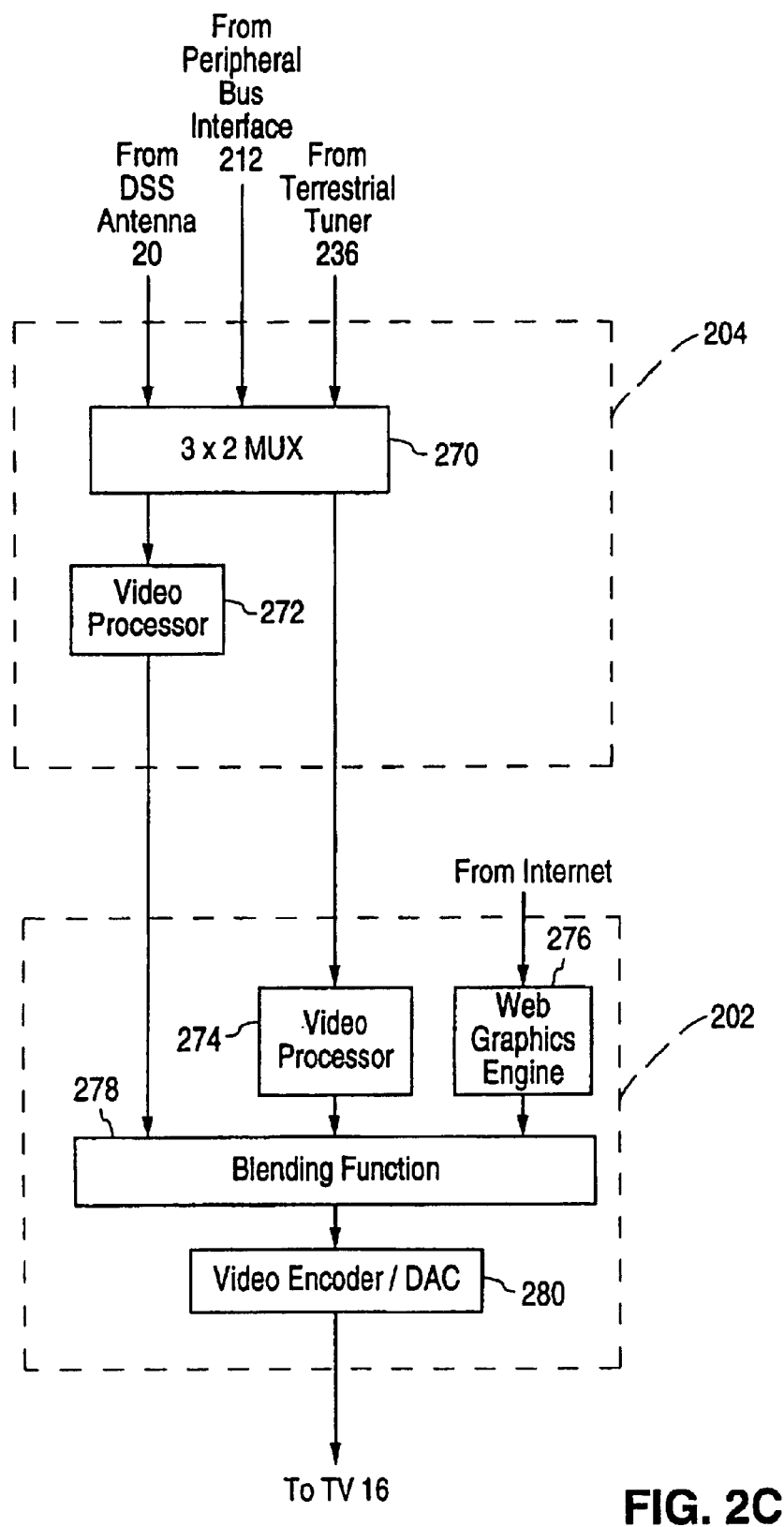

Referring now to FIGS. 2A–2C, simplified block diagrams of the DSS/WebTV receiver's circuitry are illustrated. Turning now to FIG. 2A, DSS/WebTV receiver 12 includes a DSS processing element 200. (e.g., an AV7100 chip manufactured by Texas Instruments, Inc.), an Internet processing element 202 (e.g., a QED central processing unit (CPU), manufactured by Quantum Effect Design, Inc., operably connected to an application specific integrated circuit (ASIC) such as a Solo ASIC manufactured by WebTV Networks Inc.), and buffer logic 204 (e.g., a GOM logic ASIC manufactured by Sony Corp./Sony Electronics Inc.) interconnecting DSS processing element 200 and Internet processing element 202. DSS processing element 200 converts signals received from the DSS service provider into digital signals that are transmitted to Internet processing element 202 via Buffer logic 204. Internet processing element 202 converts digital signals received from Internet service provider 24 and Buffer logic 204 into data that can be displayed on TV 16 (FIG. 1), as discussed in further detail below. Buffer logic 204 acts as a buffer that shields the processor and internal bus of DSS processing element 200 from the processor and internal bus of Internet processing element 202. Buffer logic 204 also receives signals from local programing stations 28 (e.g., local cable or broadcast stations) and transmits the signals, in original or decimated form, to Internet processing element 202, as discussed below.

DSS processing element 200 is connected to DSS antenna 20 via a low noise block down converter 206 (LNB) and a front end unit 208 (FE). LNB 206 converts a Ku-Band signal received from a satellite to an L-Band signal. The L-Band signal is then transmitted to FE 208.

FE 208 is a tuning device that amplifies, demodulates, and converts the signal received from LNB 206. The converted signal emerges as a data bit stream that is in an encrypted, encoded, and compressed form. FE 208 also performs error correction on the data bit stream. DSS processing element 200 examines and filters the data bit stream received from FE 208 based on user-selected and DSS service authorized criteria. It should be noted that the data bit stream carries video and audio data representing various DSS channels, programing data corresponding to the video and audio data, and Internet data that is transmitted over DSS, as discussed in further detail below.

An SDRAM 210 and an IEEE 1394 (Standard for High Performance Serial Bus) interface 212 are connected to DSS processing element 200. SDRAM 210 acts as an intermediate buffer for the storage of data as DSS processing element 200 performs various processing steps such as decoding, decryption, and decompression routines. Interface 212 interconnects DSS processing element 200 to peripheral devices 32 (FIG. 1) thereby permitting DSS processing element 200 to interact with peripheral devices 32.

A smart card 214 is connected to DSS processing element 200 via a card interface (not shown). Smart card 214 includes a central processing unit (CPU), a read only memory (ROM), and a random access memory (RAM). Smart card 214 determines whether the user has the authorization to receive certain data (e.g., audio/video data from a pay TV station) using the authorization information stored in its memory. If smart card 214 determines that the user is authorized, smart card 214 provides a decryption key to the DSS processing element 200 which, in turn, decrypts the audio/video data via the decryption key. It should be noted that although a smart card has been shown, other conditional access modules known by those skilled in the art are deemed within the scope of the present invention.

A ROM 216 is connected to DSS processing element 200 and Buffer logic 204 via a data bus 218 and an address bus 220. ROM 216 stores fundamental operating routines to be executed by DSS processing element 200. The operating routines include, but are not limited to, initializing routines, downloading routines, and upgrading routines.

Buffer logic 204 receives audio data, video data, Internet/DSS data, and peripheral generated data from DSS processing element 200. Buffer logic 204 processes and/or relays the received data to Internet processing element 202, as discussed in further detail below. Buffer logic 204 also receives input from a user via a remote controller input 242 and/or a remote keyboard input 244. Buffer logic 204 relays the user input to Internet processing element 202 and, if needed, adjusts the LED display on a front panel 246 of the integrated DSS/WEBTV receiver 12. Buffer logic 204 may also receive local broadcast signals via a terrestrial tuner 236 (attached to an antenna or cable line) and analog to digital processing elements 238 and 240. The particular local broadcasting channel received is selected by the user via remote controller 14 and Internet processing element 202. Buffer logic 204 processes and/or relays the digitized local broadcast to Internet processing element 202, as discussed in further detail below.

Internet processing element 202 includes a QED microprocessor and a Solo chip. The QED microprocessor processes routines stored in internal and external memories (e.g., ROM 224) and the Solo chip provides the QED microprocessor with peripheral functions such as, but not limited to, audio processing, remote control signal processing, memory assignment, graphics processing, and discrete I/O functions. Internet processing element 202 also includes an internal soft modem 226 that communicates with the Internet service provider 24 via a subscriber line interface coder/decoder (SLIC/Codec) interface 222. SLIC/Codec interface 222 acts as a digital to analog converter between Internet processing element 202 and phone line 23. Information processed by soft modem 226 is either stored in a memory (e.g., Hard Disk Dive (HDD) 228) or is further processed by a graphics engine of the Solo chip such that the information from the Internet can be displayed on TV 16 (FIG. 1).

ROM 224, HDD 228, and Flash memory 230 are connected to Internet processing element 202 via a data bus 233. ROM 224 stores the fundamental operating routines of Internet processing element 202. The fundamental operating routines include, but are not limited to, initializing routines, downloading routines, upgrading routines, and the like. Flash memory 230 stores all semi-volatile applications such as, but not limited to, icon generation, GUI generation, and the like. HDD 228 stores the volatile information that is the most likely to be modified. Such volatile information includes, but is not limited to, Internet data or DSS/Internet data that is to be displayed on TV 16, as discussed in further detail below. An SDRAM 232 is connected to Internet processing element 202 and acts as an intermediate buffer for the storage of data as Internet processing element 202 performs various processing steps such as decoding, decryption, and decompression routines.

A smart card 234 is connected to Internet processing element 202 via a card interface (not shown). Smart card 234 includes a central processing unit (CPU), a read only memory (ROM), and a random access memory (RAM). Smart card 234 determines whether the user has the authorization to access certain web sites (e.g., web sites displaying or discussing mature subject matters) using the authorization information stored in its memory. If smart card 234 determines that the user is authorized, smart card 234 provides a decryption key to the Internet processing element 202 which, in turn, decrypts the received Internet data via the decryption key. It should be noted that although a smart card has been shown, other conditional access modules known by those skilled in the art are deemed within the scope of the present invention.

Internet processing element 202 receives DSS data and local broadcast data from Buffer logic 204 and blends the received data with data received from the Internet service provider 24. Afterwards, Internet processing element 202 transmits the blended data to DAC (digital to analog converters) for displaying the blended data on TV 16. It should be noted that the video portion of the data may be output in an S-Video, composite, or RF format.

Internet processing element 202 also receives DSS/Internet data from Buffer logic 204 and stores the DSS/Internet data on HDD 228. The DSS/Internet data represents, e.g., web sites that the user can access via the "Best of Web" feature of the GUI, as discussed in further detail below. Storing DSS/Internet data on HDD 228 enables a user to access predetermined web sites in real time, thereby, removing the access and interconnection delays traditionally encountered when communicating with web sites over a phone line.

Turning now to FIG. 2B, a simplified block diagram of Buffer logic 204 is shown. In general, Buffer logic 204 carries three types of information between DSS processing element 200 and Internet processing element 202: basic command signals (e.g., tune to channel 100), basic status signals (e.g., tuning complete), and large bandwidth signals (e.g., program guide information, web sites for caching in HDD 228, firmware updates, and the like). It should be noted that the internal routing of video signals from DSS processing element 200 and terrestrial tuner 236 is illustrated in FIG. 2C and discussed below.

Buffer logic 204 includes two narrowband (e.g., 2 KBytes) FIFO buffers 250 and 252 and one wideband (e.g., 64 KBytes) FIFO buffer 254. FIFO buffers 250–254 are connected to DSS processing element 200 via a multiplexer 256, an address decoder 258, and an interrupt controller 260. FIFO buffers 250–254 are connected to Internet processing element 202 via a multiplexer 262, a DMA controller 264, an address decoder 266, and an interrupt controller 268.

In operation, DSS processing element 200 periodically downloads large amounts of data (e.g., program guide information, web sites for caching in HDD 228, firmware updates) to FIFO buffer 254 by signaling address decoder 258 and downloading the data to multiplexer 256. Multiplexer 256 receives the address of FIFO buffer 254 from address decoder 258 and relays the data from DSS processing element 200 to FIFO buffer 254. Interrupt controller 268 is, preferably, programed to transmit an interrupt signal to Internet processing element 202 when the amount of data stored in FIFO buffer 254 reaches a predetermined level (e.g., 30 KBytes). In response to the reception of the interrupt signal, the QED microprocessor (not shown) downloads the data stored in FIFO buffer 254 by signaling address decoder 266 and instructing DMA controller 264 to transport the incoming data to a selected memory location (e.g., HDD 228, flash memory 230, or SDRAM 232). Address decoder 266, in turn, transits the address of FIFO buffer 254 to multiplexer 262 and DMA controller directs the incoming data from multiplexer 262 to the selected memory.

In addition to routing large amounts of data from DSS processing element 200 to Internet processing element 202, Buffer logic 204 facilitates the transfer of commands and responses between DSS processing element 200 and Internet processing element 202. For example, when the user requests, via remote controller 14, a new DSS channel, the signal from remote controller 14 is received by Buffer logic 204 and routed to Internet processing element 202. Internet processing element 202, in turn, transmits a high level "tune to new channel" command to FIFO buffer 252 by signaling address decoder 266 and transmitting the command to multiplexer 262.

Afterwards, address decoder 266 supplies multiplexer 262 with the address of FIFO buffer 252 and multiplexer 262 routes the "tune to new channel" command to FIFO buffer 252. After the "tune to new channel" command is received, interrupt controller 260 detects the reception of the command by FIFO buffer 252 and transmits an interrupt signal to DSS processing element 200. The interrupt signal notifies DSS processing element 200 that a pending command/request is stored in FIFO buffer 252. Upon receipt of the interrupt signal, DSS processing element signals address decoder 258. Address decoder 258, in turn, transmits the address of FIFO buffer 252 to multiplexer 256 and multiplexer 256 downloads the "tune to new channel" command from FIFO buffer 252 to DSS processing element 200.

Upon receipt of the "tune to new channel" command, DSS processing element 200 executes a "tune to new channel" routine that is stored on ROM 216. The routine includes a complex sequence of instructions that are required to enable DSS processing element 200 to tune to the new channel. The instructions include, but are not limited to, determining the identity of the new channel, determining which DSS satellite carries the new channel, the bit stern location of information transmitted on the new channel (e.g., every fifth time slot), determining if the user is authorized to view the new channel (via smart card 214), and decryption instructions for decrypting the data carried on the new channel.

Once DSS processing element 200 completes executing the "tune to new channel" routine, DSS processing element transmits a status message to Internet processing element 202. The status message indicates whether the requested command has been executed. Some exemplary status messages include "channel tuned," "channel not authorized," "system inoperative," and the like. To transmit the status message to Internet processing element 202, DSS processing element 200 transmits the status message to multiplexer 256 and signals address decoder 258. Address decoder 258, in response, transmits the address of FIFO buffer 250 to multiplexer 256 which, in turn, relays the status message to FIFO buffer 250. Afterwards, interrupt controller 268 detects the reception of the status message by FIFO buffer 250 and transmits an interrupt signal to Internet processing element 202. In response to the reception of the interrupt signal, Internet processing element 202 downloads the status message stored in FIFO buffer 250 by signaling address decoder 266 and instructing DMA controller 264 to transport the incoming data to a selected memory location (e.g., internal memory, HDD 228, flash memory 230, or SDRAM 232). Address decoder 266, in turn, transmits the address of FIFO buffer 250 to multiplexer 262 and DMA controller directs the status message from multiplexer 262 to the selected memory. Finally, Internet processing element 202 examines the stored status message and transmits the appropriate response to the user. Some exemplary responses include displaying the new channel on TV 16, displaying an "unauthorized" message, displaying an "error" message, and the like.

Turning now to FIG. 2C, a simplified block diagram of the internal routing of video signals in integrated DSS/WebTV receiver 12 is illustrated. There are three sources for the video signals input to integrated DSS/WebTV receiver 12: video signals received via DSS antenna 20, video signals received from a peripheral device (e.g., a camcorder or other video recording device) via peripheral bus interface 212, and video signals received from terrestrial tuner 236. The DSS and peripheral device video signals are processed (decoded, decompressed, etc.) by DSS processing element 200 and relayed to Buffer logic 204. The terrestrial video signals are converted to a digital format by digital to analog converter 240 and relayed to Buffer logic 204.

Upon reception of the video signals, Buffer logic 204 routes the video signals through a 3x2 multiplexer 270. One output of multiplexer 270 is connected to a video processor 272 located within Buffer logic 204 and the other output of multiplexer 270 is connected to a video processor 274 located within Internet processing element 202. Each video processor 272 and 274 either performs a decimation process on the video signals or allows the video signals to pass therethrough. If the video signals undergo the decimation process, the decimated video signals will produce a decimated video frame on TV 16. If the video signals do not undergo the decimation process, the video signals will produce a full-screen video frame on TV 16. The decimation process is discussed in further detail below.

Video processors 272 and 274 transmit the video signal (decimated or unprocessed) to a blending function 278 of Internet processing element 202. Signals received from the Internet (via the phone line or DSS transmission) are also transmitted to blending function 278 after being processed by a web graphics engine 276. As discussed above, web graphics engine 276 processes the Internet signals into a form that can be displayed on TV 16. Blending function 278 is a software program stored in memory (e.g., internal memory, ROM 224, or flash memory 230) that Internet processing element 202 executes to integrate the received signals into a form that can be displayed on TV 16. After undergoing the blending function, the blended signals are transmitted to video encoders and digital to analog converters 280 which, as discussed above, display the blended signals on TV 16. It should be noted that the blending function and decimating procedure are only executed in response to a request from a user. For example, if a user is merely watching a TV show, the blending function and the decimating procedure are not executed. However, if the user requests a GUI (as discussed below), both the blending function and the decimation process may be executed.

Figure 3:
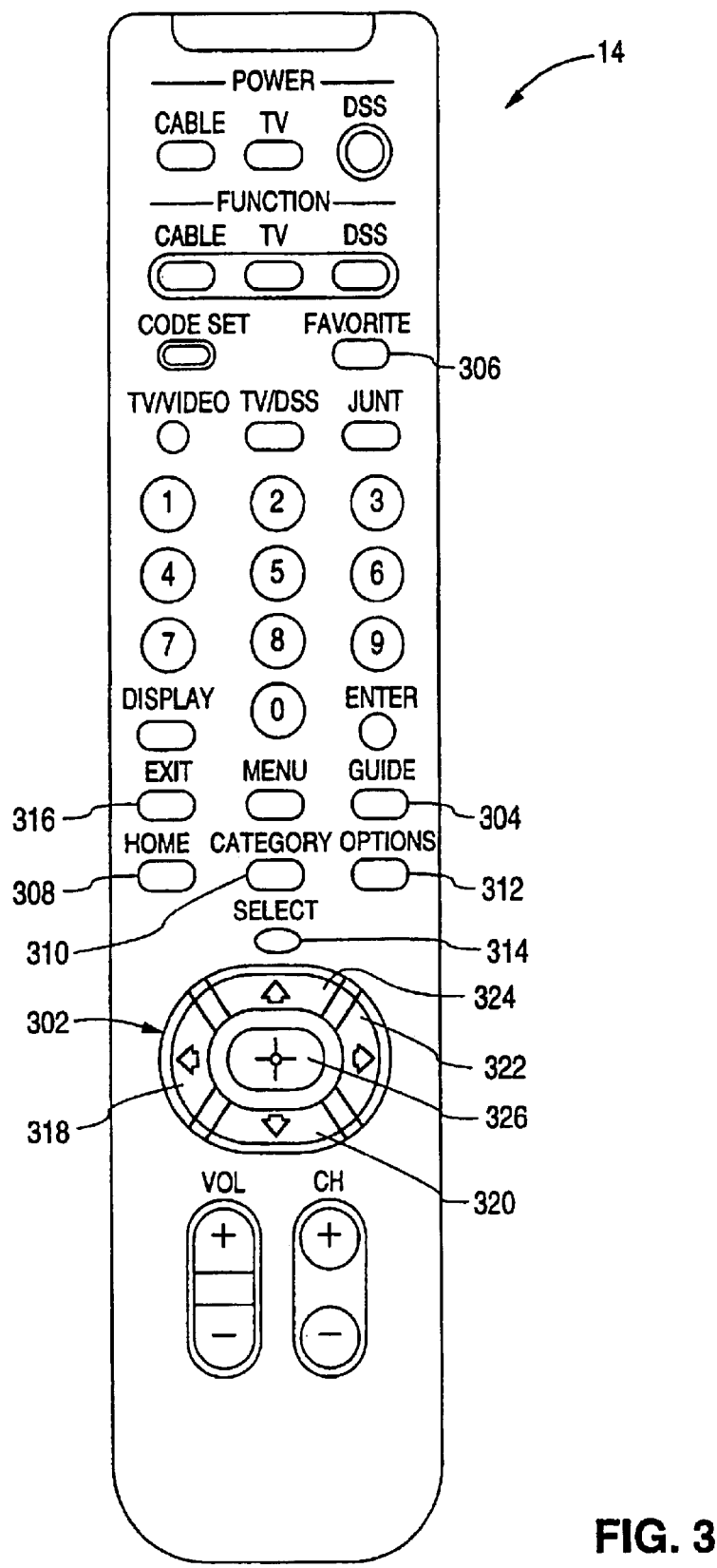
FIG. 3 is a representation of a remote controller utilized in the entertainment system of FIG. 1.

Referring now to FIG. 3, one embodiment of remote controller 14 is shown. As discussed above, remote controller 14 is utilized by a user to transmit commands and make program selections in accordance with the teachings of the present invention. In operation, the user may actuate a plurality of operation keys of remote controller 14 to control how the integrated receiver 12 displays video and audio information on TV 16. The plurality of operation keys include, but are not limited to, a direction pad 302 having a plurality of direction keys 318–324 and an enter key 326, a "GUIDE" key 304 for prompting integrated receiver 12 to display an electronic program guide on TV 16, a "FAVORITE" key 306 for prompting integrated receiver 12 to display a user-customized favorite channel screen on TV 16, a "HOME" key 308 for prompting integrated receiver 12 to display a Home screen on TV 16, a "CATEGORY" key 310 for prompting integrated receiver 12 to display a category guide on TV 16, an "OPTIONS" key 312 for prompting integrated receiver 12 to display an option palette on TV 16, a "SELECT" key 314 for prompting integrated receiver 12 to display a feature selected by the user on TV 16, and an "EXIT" key 316 for prompting integrated receiver 12 to discontinue displaying a selected menu or feature.

Figure 4:
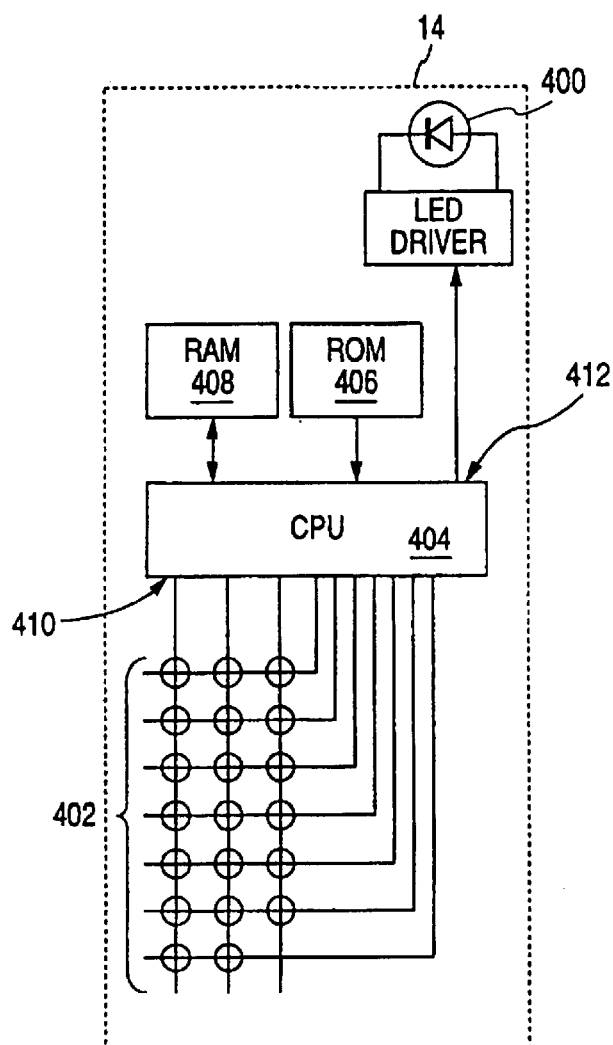
FIG. 4 is a simplified block diagram of the circuitry utilized in the remote controller of FIG. 3.

Referring now to FIG. 4, a simplified a block diagram of the remote controller circuitry is illustrated. Remote controller 14 has an infrared originating device 400, a set of operation keys 402 (corresponding to the operation keys of FIG. 3), a CPU 404, a ROM 406 and a RAM 408. CPU 404 receives a signal sent from an operation key 402 through an input port 410. The signal is processed according to a program stored in ROM 406. RAM 408 is used as a working space for generating a transmitting code. The transmitting code is sent to the infrared originating device 400 through an output port 412 and converted into an infrared signal. The infrared signal is transmitted to infrared receiver 13 of integrated DSS/WebTV receiver 12.

Figure 5:
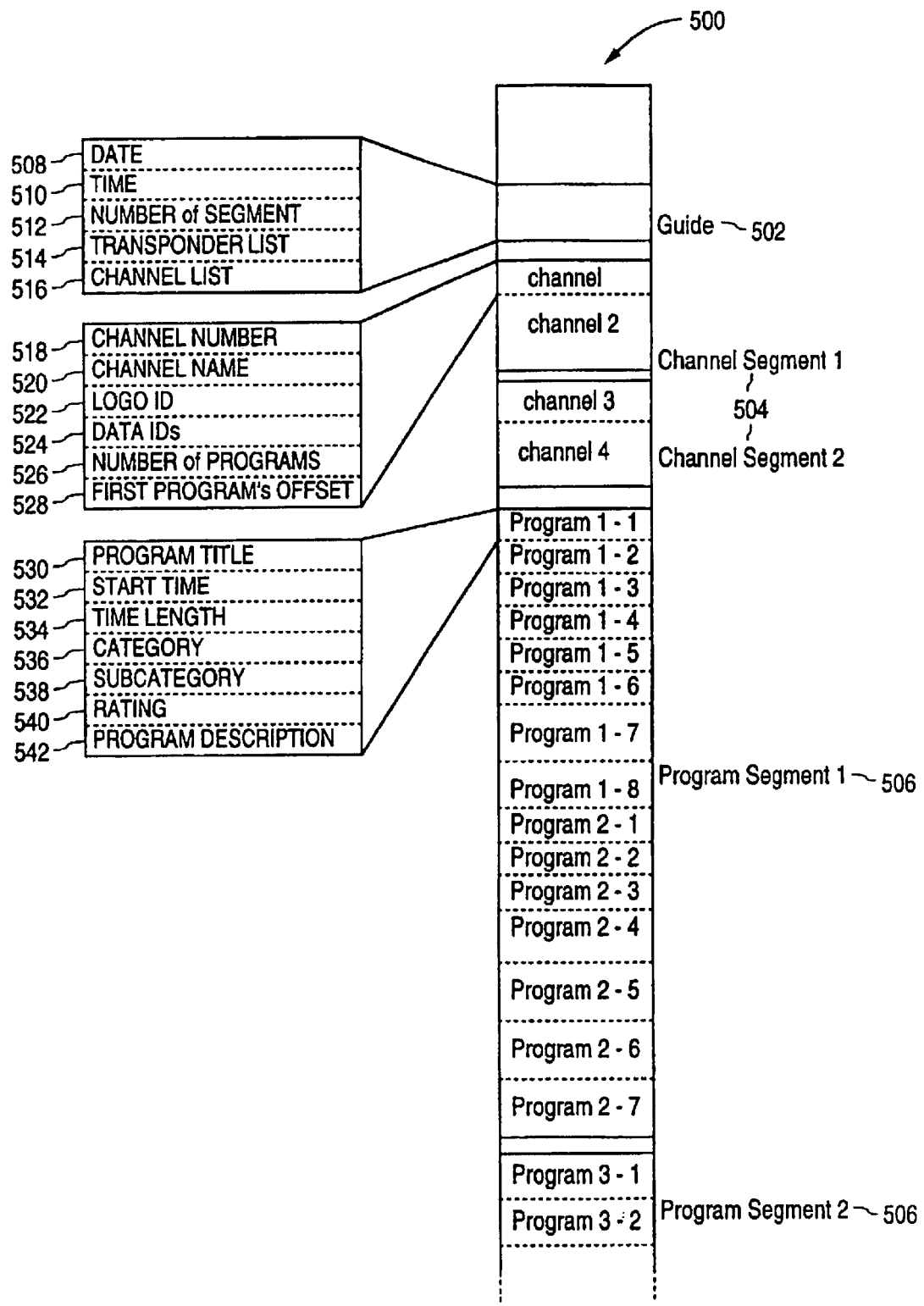
FIG. 5 illustrates the DSS data received and stored by the DSS/WebTV receiver of the present invention.

Referring now to FIG. 5, a block diagram of data 500 stored in a portion of HDD 228 and/or flash memory 230 (FIG. 2A) is illustrated. As discussed above, HDD 228 and/or flash memory 230 store guide data 502, channel data 504, and program data 506. Guide data 502 includes, but is not limited to, date information 508, time information 510, a segment number identifier 512 that identifies the data segment, a transponder list 514 that identifies the transponder transmitting the data segment, and a channel list 516 that identifies a channel number associated with a portion of data.

Channel data 504 includes a channel number 518, a channel name 520 (e.g., the call sign of a broadcast station), a logo ID 522 (e.g., an identification of the channel logo), a data ID 524 that identifies a channel of MPEG video data or MPEG audio data, a number of programs 526 that identifies the number of programs to be transmitted on a channel during a predetermined time frame, and a first program offset 528 that identifies the offset from the header to the fist channel data in a segment.

Program data 506 includes a program title 530, a program start time 532, a time length 534 indicating the duration of the program, a program category 536 (e.g., movies, news, sports, etc.), a program subcategory 538 (e.g., subcategories of sports such as baseball, basketball, football), a program rating 540 (e.g., "R", "PG", "G") and a program description 542 that provides a detailed description of the program (e.g., story line, actors).

Figure 6:
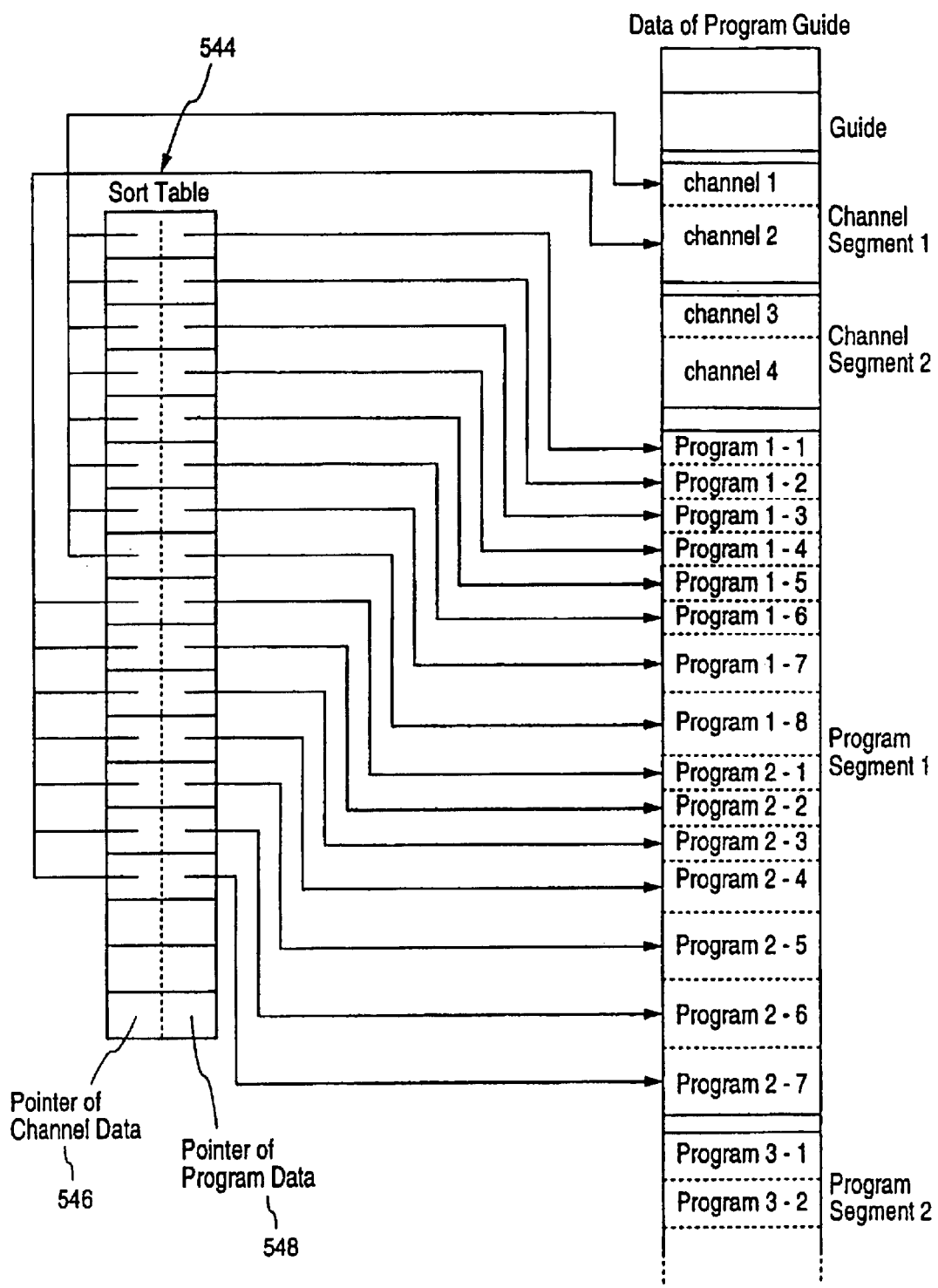
FIG. 6 illustrates the pointers to the DSS data of FIG. 5 that are utilized to generate the user interface in accordance with the teachings of the present invention.

Referring now to FIG. 6, DSS processing element 200 generates a pointer table 544 in response to the reception of data 500. DSS processing element 200 stores the pointer table 544 in HDD 228 and/or flash memory 230. Pointer table 544 contains the location of channel data 546 and program data 548 in HDD 228 and/or flash memory 230. In operation, when the user selects a program for viewing (via controller 14), Internet processing element 202 transmits a "tune to new channel" request to DSS processing element 200. In response, DSS processing element 200 executes a channel locating routine (stored in ROM 216) and determines the location of the channel data and program data corresponding to the selected program by accessing pointer table 544. After the location determination is completed, DSS processing element 200 tunes to the new channel and transmits a status message to Internet processing element 202 via Buffer logic 204. If the user is authorized to receive the new channel (and no errors have occurred), Internet processing element 202 receives the video and audio signals from DSS processing element 200 and Buffer logic 204, performs any necessary blending and/or decimating techniques, and displays the requested program on TV 16.

Figure 7:
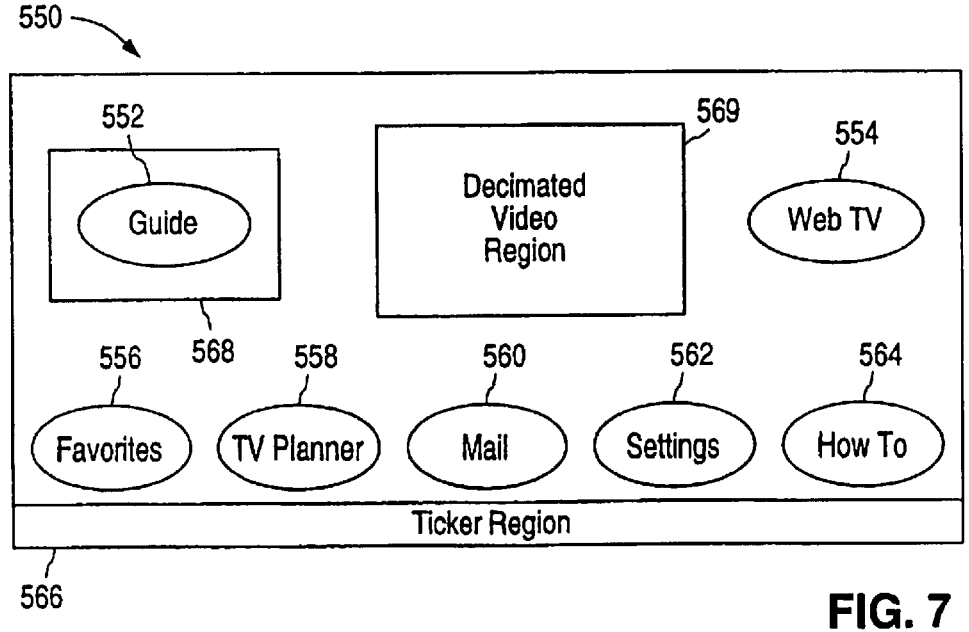
FIG. 7 illustrates a Home screen of the GUI of the present invention.

Referring now to FIG. 7, a Home screen 550 of a Graphical User Interface (GUI) of the present invention is shown. The GUI, generated by DSS processing element 200 and Internet processing element 202, is displayed on TV 16 and permits a user to select a channel for viewing and to access the Internet GUI home screen 550 includes, but is not limited to, a "Guide" icon 552, a "WebTV" icon 554, a "Favorites" icon 556, a "TV Planner" icon 558, a "Mail" icon 560, a "Setting" icon 562, a "How To" icon 564, and a movable highlight box (or pointer) 568. Icons 552–564 represent accessible screens, pull-down menus, and features that a user can display on TV 16, as discussed below. GUI Home screen 550 also includes a scrolling ticker region that displays information about upcoming events (e.g., upcoming pay-per-view movies and sporting events) and a decimated video region 569 that displays, in reduced form, the current DSS channel (including channel name, channel number, and program title) being viewed by the user.

In operation, the user positions highlight box 568 on icons 552–564 by pressing direction keys 318–324 of remote controller 14 in the appropriate direction. Once the user has positioned the highlight box 568 on a desired icon, the user can display the menu corresponding to the highlighted icon by pressing enter key 326 of controller 14. It should be noted that some menus (e.g., "Guides", "Favorites") can be displayed by highlighting a corresponding icon in GUI Home screen 550 or by pressing a corresponding key of remote controller 14. Selection of a particular icon by the user by means of highlight box 568 and enter key 326 is noted by either Internet processing element 202 or DSS processing element 200, depending on the icon. In response to the user's selection of Internet-related icons, Internet processing element 202 displays Internet web page data from storage device HDD 228, or flash memory 230, or carries out functions which correspond to the selected icon from routines stored in ROM 224. It should be noted that some of the data stored in HDD 228 or flash memory 230 is downloaded by DSS processing element 200, as described above, from a DSS service provider. In response to the user's selection of DSS-related icons, DSS processing element 200 displays sensory data (audio and video data) received from the DSS service provider, displays the GUI received from storage device HDD 228 or flash memory 230, or carries out functions which correspond to the selected icon from routines stored in ROM 216.

Figure 8:
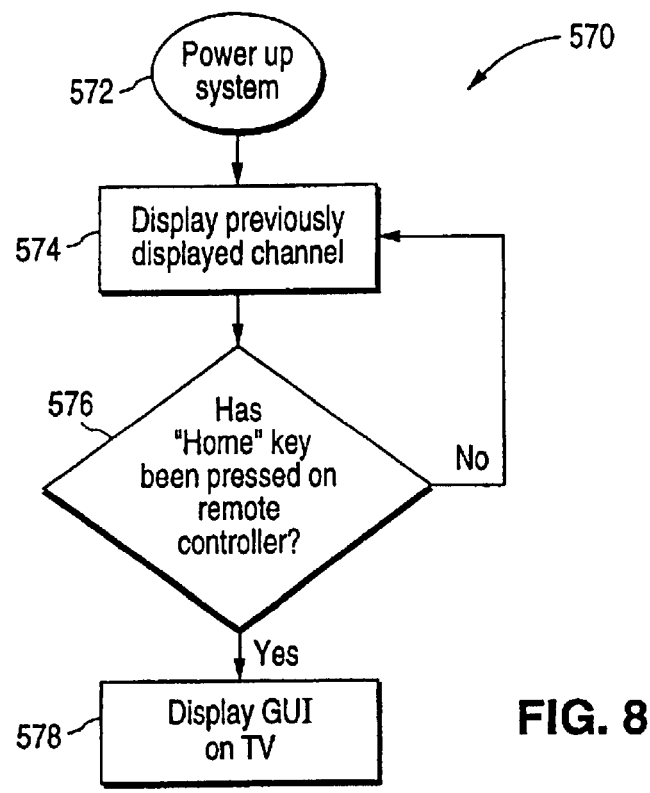
FIG. 8 is an exemplary flowchart illustrative of a user turning on the DSS/WebTV system and accessing the GUI Home screen of FIG. 7.

Referring now to FIG. 8, an exemplary flowchart 570 illustrative of a user turning on entertainment system 10 and accessing GUI Home screen 550 is shown. Initially, at step 572, the user powers up entertainment system 10 by pressing the power button(s) on remote controller 14. Upon power up, at step 574, the channel that was previously displayed when entertainment system 10 powered down is displayed on TV 16. Afterwards, at step 576, integrated DSS/Web TV receiver 12 monitors signals from remote controller 14 to determine if the user has pressed "HOME" key 308. If "HOME" key 308 has not been pressed, integrated DSS/Web TV receiver 12 continues to display the previously displayed channel and monitor signals from remote controller 14. If "HOME" key 308 has been pressed, integrated DSS/Web TV receiver 12, at step 578, displays GUI Home screen 550 on TV 16.

As discussed above, GUI Home screen 550 contains a decimated video region 569 that displays the current channel selected by the user. A full-screen video frame is reduced to a decimated video frame by a decimation process. The decimation process is a down-conversion filtering process that reduces the definition or resolution of the full-screen video frame to a frame size convenient for display in the GUI. Decimating the full-screen video frame results in a decimated video frame having pixel dimensions that are a fraction of the dimensions of the full-screen video frame. The decimation process of the present invention uses known filtering and digital signal processing techniques to eliminate a number of pixels from the full-screen video frame. For example, one exemplary decimation technique might drop every other pixel in the vertical and horizontal directions (X,Y) from the full-screen video frame, thereby providing a decimated video frame having pixel dimensions that are one-half of the X,Y pixel dimensions of the full-screen video frame, i.e., a window 1/16 of actual size. The number of pixels eliminated from the full-screen video frame is determined by the size of the decimated video frame to be displayed in the GUI. In one embodiment, the decimated video frame has, but is not limited to, pixel height and width that are one-fourth of the pixel dimensions of the full-screen video frame. As discussed above, decimated video is stored in a memory (e.g., HDD 228 and/or flash memory 230) for later display.

Figure 9:
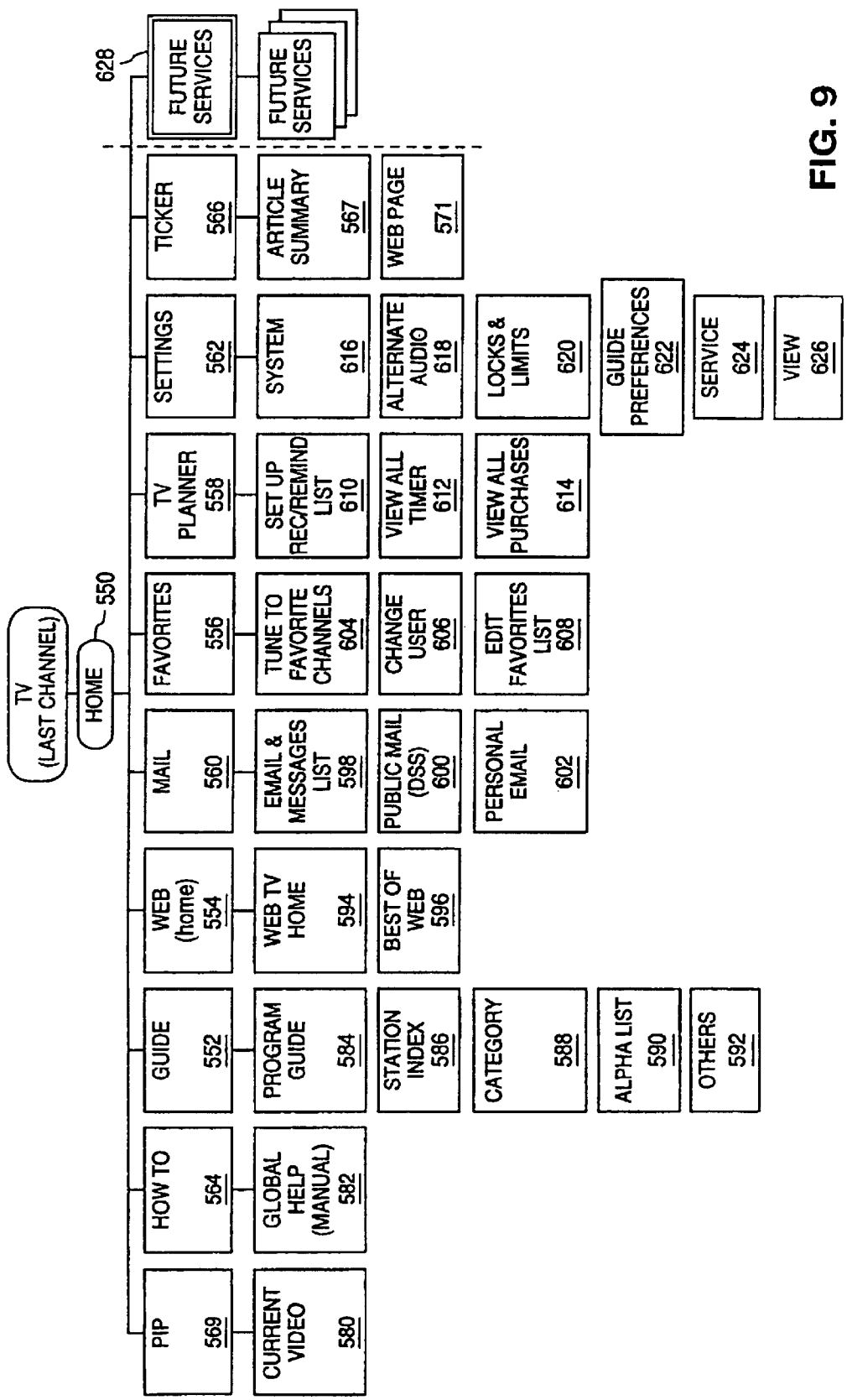
FIG. 9 is a block diagram illustrating GUI screens, pull-down menus, and features that can be accessed via the GUI Home screen of FIG. 7.

Referring now to FIG. 9, a plurality of features and/or menus that the user can access via GUI Home screen 550 are shown. As discussed above, GUI Home screen 550 includes a decimated video region, a so-called picture-in-picture (PIP) region 569 that displays a reduced frame size video 580 of a currently selected program and a scrolling ticker region 566 that displays information about upcoming events, stocks, sport scores, and the like. The user can access an "Article Summary" icon 567 or a "Web Page" icon 571 associated with the information displayed on ticker region 566 by selecting the ticker region 566 via the highlight box (or pointer) 568 (shown in FIG. 7). "Article Summary" icon 567, if selected, provides t he user with additional information about the upcoming event that is not otherwise displayed on ticker region 566. "Web Page" icon 571, if selected, provides the user with an interactive setting for receiving additional information about the upcoming event. For example, ticker region 566 may display a message that states that an upcoming football game will be shown on channel 4 at 2 pm on Nov. 24, 1999. If the user desires to have further information about the game, the user may select "Article Summary" icon 567 to receive information such as the football team's records, conferences, and the like. The user may also select "Web Page" icon 571 to access each team's web page and/or the football portion of the web page of channel 4. As discussed above, these web pages are downloaded from the DSS network, stored on HDD 228, and retrieved from the HDD 228 by the Internet processing element 202 in response to selection of an icon by the user.

GUI Home screen 550 also includes a plurality of icons that permit the user to access screens, pull-down menus, and/or features that facilitate the user's navigation through DSS channels and the Internet, as discussed below. In general, the user can access a menu or feature by selecting an icon (i.e., positioning highlight box 568 over the icon) and pressing enter key 236. The following descriptions describe the screens, pull-down menus, or features that the user can access by selecting the various icons in GUI Home screen 550. As discussed above, the selection of a particular icon by the user by means of highlight box 568 and enter key 326 is noted by either Internet processing element 202 or DSS processing element 200, depending on the icon. In response to the user's selection of Internet-related icons, Internet processing element 202 displays Internet web page data from storage device HDD 228, or flash memory 230, or carries out functions which correspond to the selected icon from routines stored in ROM 224. It should be noted that some of the data stored in HDD 228 or flash memory 230 is downloaded by DSS processing element 200, as described above, from a DSS service provider. In response to the user's selection of DSS-related icons, DSS processing element 200 displays sensory data (audio and video data) received from the DSS service provider, displays the GUI received from storage device HDD 228 or flash memory 230, or carries out functions which correspond to the selected icon from routines stored in ROM 216.

If "How To" icon 564 is selected, DSS processing element 200 generates a global help manual 582 that provides the user with information regarding how the user can utilize various features of entertainment system 10.

If "Guide" icon 552 is selected, DSS processing element 200 generates a pull-down menu having the following options: an Electronic Program Guide (EPG) 584, a Station Index 586, a Category 588, an alphabetical Listing 590, and Others 592. As discussed below (FIGS. 12–19), the user can select from one or more of options 584–590 to display programing information in a predetermined manner.

If "WebTV" icon 554 is selected, Internet processing element 202 generates a WebTV home page 594 that provides the user with access to the Internet. In addition, DSS processing element 200 generates a "Best Of Web" icon 596 that, if selected, displays a list of preferred Web sites that are downloaded from the Internet or, preferably, from the user's DSS provider.

If "Mail" icon 560 is selected, Internet processing element 202 generates an electronic mail list 598 that includes public mail 600 received from the users DSS provider and personal mail 602 that is provided by the user's Internet service provider. Public mail 600 is distinguished from personal mail 602 by differentiation indicia such as a difference in color, font style, associated icons, or the like. In operation, public mail 600 can only be read by the user and is typically utilized by the DSS service provider to provide the user with promotions, advertisements and the like. Personal mail 602, however, allows the user to transmit and receive e-mail via the Internet.

Figure 10:
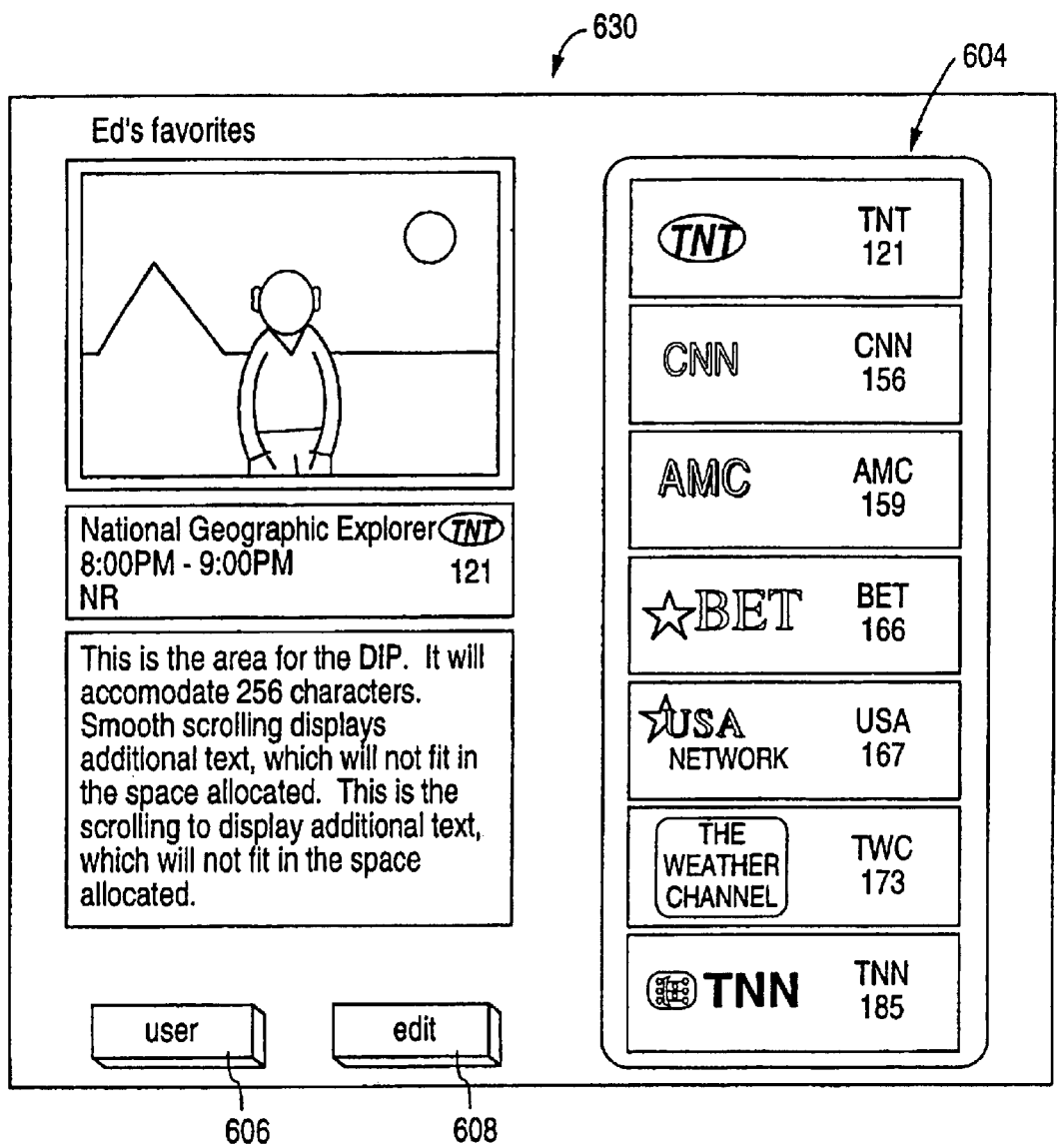
FIG. 10 illustrates a Favorite screen of the GUI of the present invention.

If "Favorites" icon 556 is selected, DSS processing element 200 generates a favorite channel screen 630, as shown in FIG. 10. Favorite channel screen 630 includes a list of favorite channels 604, a "user" icon 606 and an "edit" icon 608. The user selects "user" icon 606 if the user desires to view a list of favorite channels associated with another user ID (e.g., a parent viewing a child's list of favorite channels). The user selects "edit" icon 608 if the user desires to alter channel list 604 by removing or adding channels.

Figure 11:
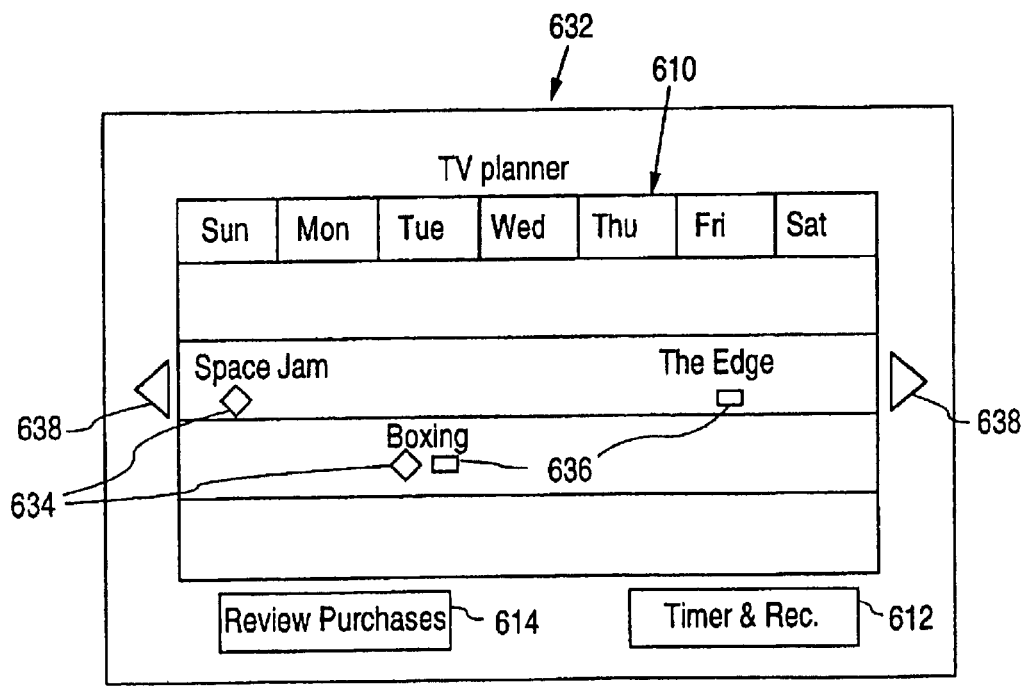
FIG. 11 illustrates a TV Planner screen of the GUI of the present invention.

If "TV Planner" icon 558 is selected, DSS processing element 200 generates a TV Planner screen 632, as shown in FIG. 11. TV Planner screen 632 includes a monthly calender (or recording/reminder list) 610 that indicates which programs are purchased and/or selected for recording by VCR 42 (FIG. 1). A "Purchase" icon 634 appears adjacent purchased programs and a "Record" icon 636 appears adjacent programs to be recorded. If the user selects "Purchase" icon 634, the user is visually presented (e.g., via a pull-down menu) with the cost, date, and time of the purchased program. If the user selects "Record" icon 636, the user is visually presented (e.g., via a pull-down menu) with the title, date, and time of the program to be recorded. TV Planner screen 632 also includes a "Timer & Rec." icon 612 and a "Review Purchases" icon 614.

If the user selects "Timer & Rec." icon 612, the user is presented with a "Timer & Rec." screen (not shown) that lists the programs that the user selected to view or record. If the user selects "Review Purchases" icon 614, the user is presented with a "Review Purchases" screen (not shown) that lists all the programs purchased (e.g., PPV programs) by the user in a given time period (e.g., one month). It should be noted that the user can modify selected data (e.g., delete or add programs ) when the user is in the "Timer & Rec" or "Review Purchases" screens. The user may also scroll from time period to time period (e.g., month to month) within TV Planner screen 632 by selecting an arrow 638.

If "Settings" icon 562 is selected, DSS processing element 200 and/or Internet processing element 202 generate a "Settings" screen that includes a "System" icon 616, an "Alternate Audio" icon 618, a "Locks & Limits" icon 620, a "Guide Preferences" icon 622, a "Service" icon 624, and a "View" icon 626. If the user selects "System" icon 616, the user is presented with a number of system configuration options such as antenna alignment, color adjustment, and the like. If the user selects "Alternate Audio" icon 618, the user is presented with an Audio screen (not shown) that provides the user with a plurality of audio options. If the user selects "Locks & Limits" icon 620, the user is presented with a "Locks and Limits" screen (not shown) that allows the user to select a spending limit (e.g., $200 per month for Pay Per View (PPV)), select a rating limit (e.g., only "PG" shows can be viewed on PPV), and enter a password for entering the selected limits or overriding earlier selected limits. If "Guide Preferences" icon 622 is selected, the user is presented with a number of guide configuration options such as displaying channels in numerical order, displaying channels in alphabetical order, displaying all received channels, displaying only pre-selected channels, and the like. If the user selects "Service" icon 624, the user is presented with a menu (not shown) that instructs the user to call a service representative and initiate a self-diagnostic test on the DSS/WebTV receiver. The user receives further instruction from the called service representative. If the user selects "View" icon 626, the user is presented with a plurality of sizing options for displaying the video on the TV screen.

New services or features may be added to entertainment system 10 via DSS, cable, and/or Internet communications. It is considered within the scope of the invention to provide icons 628 in GUI Home screen 550 to permit the user to access the new service or features. For example, a "Game" icon may be added to GUI Home screen 550 to facilitate a user's ability to download games from the Internet.

Figure 12:
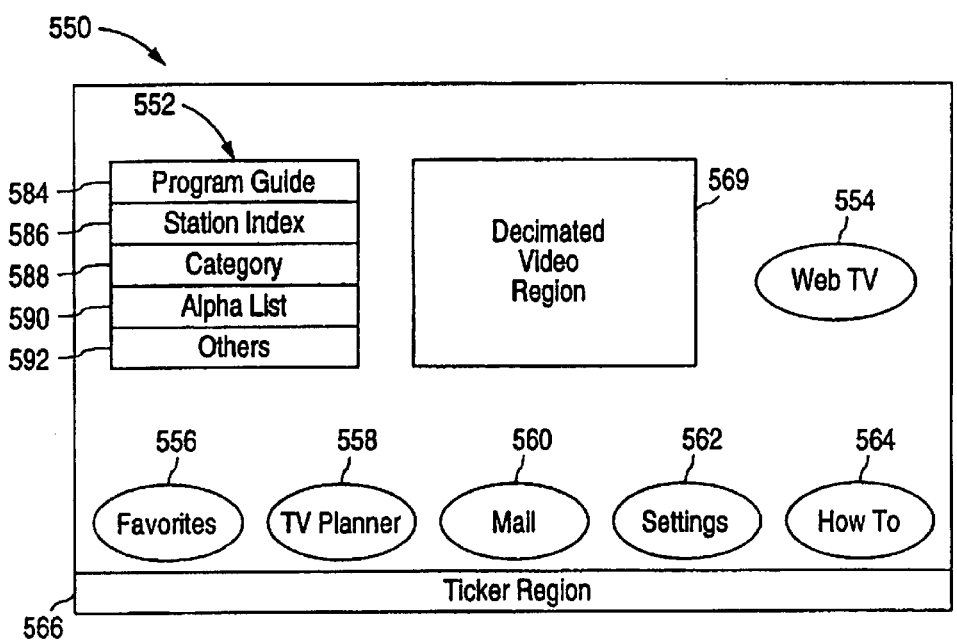
FIG. 12 illustrates the GUI Home screen of FIG. 7 having a Guides pull-down menu opened in accordance with the teachings of the present invention.
Figure 13A:
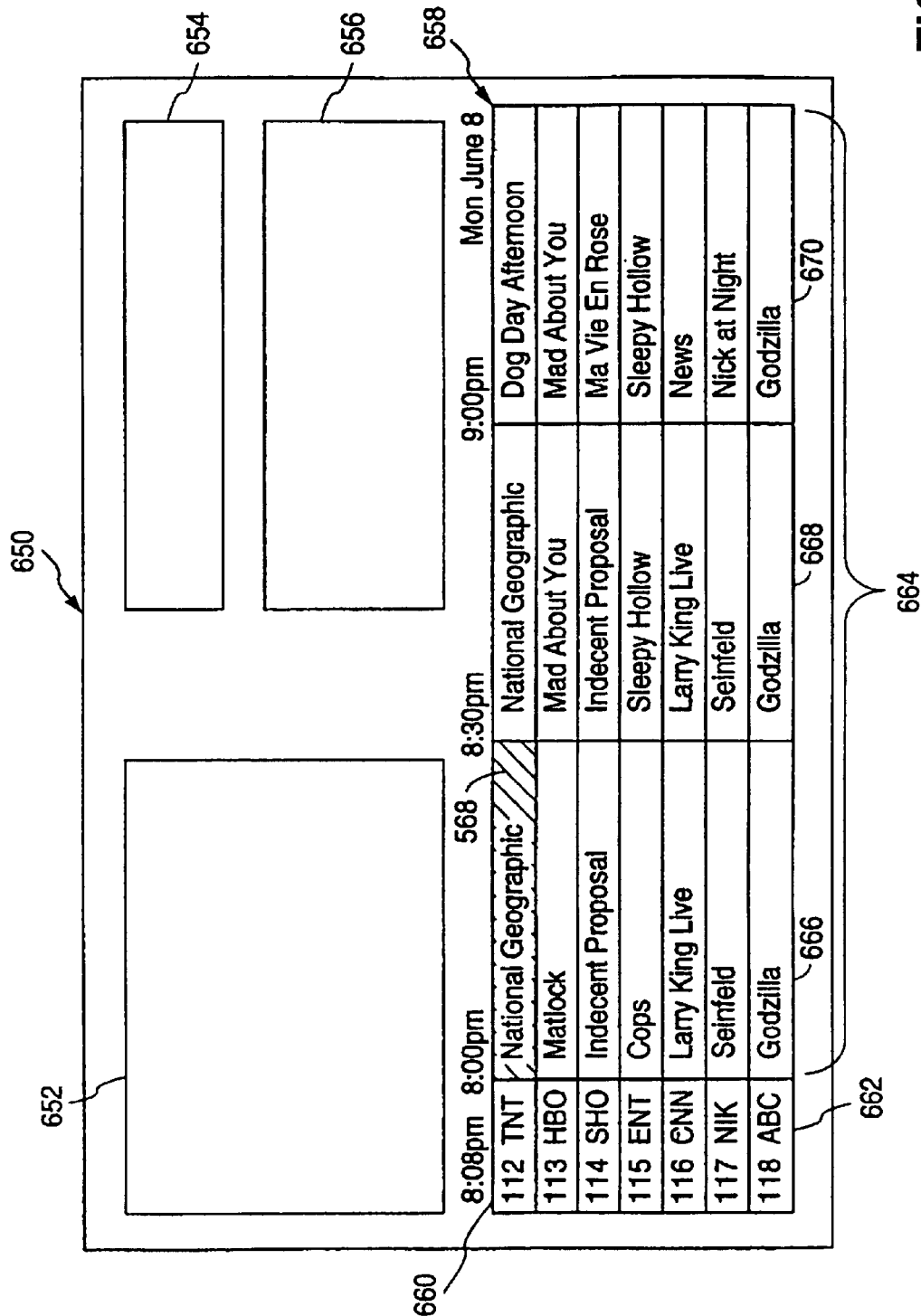
FIGS. 13A and 13B illustrate an EPG of the GUI of the present invention.
Figure 13B:
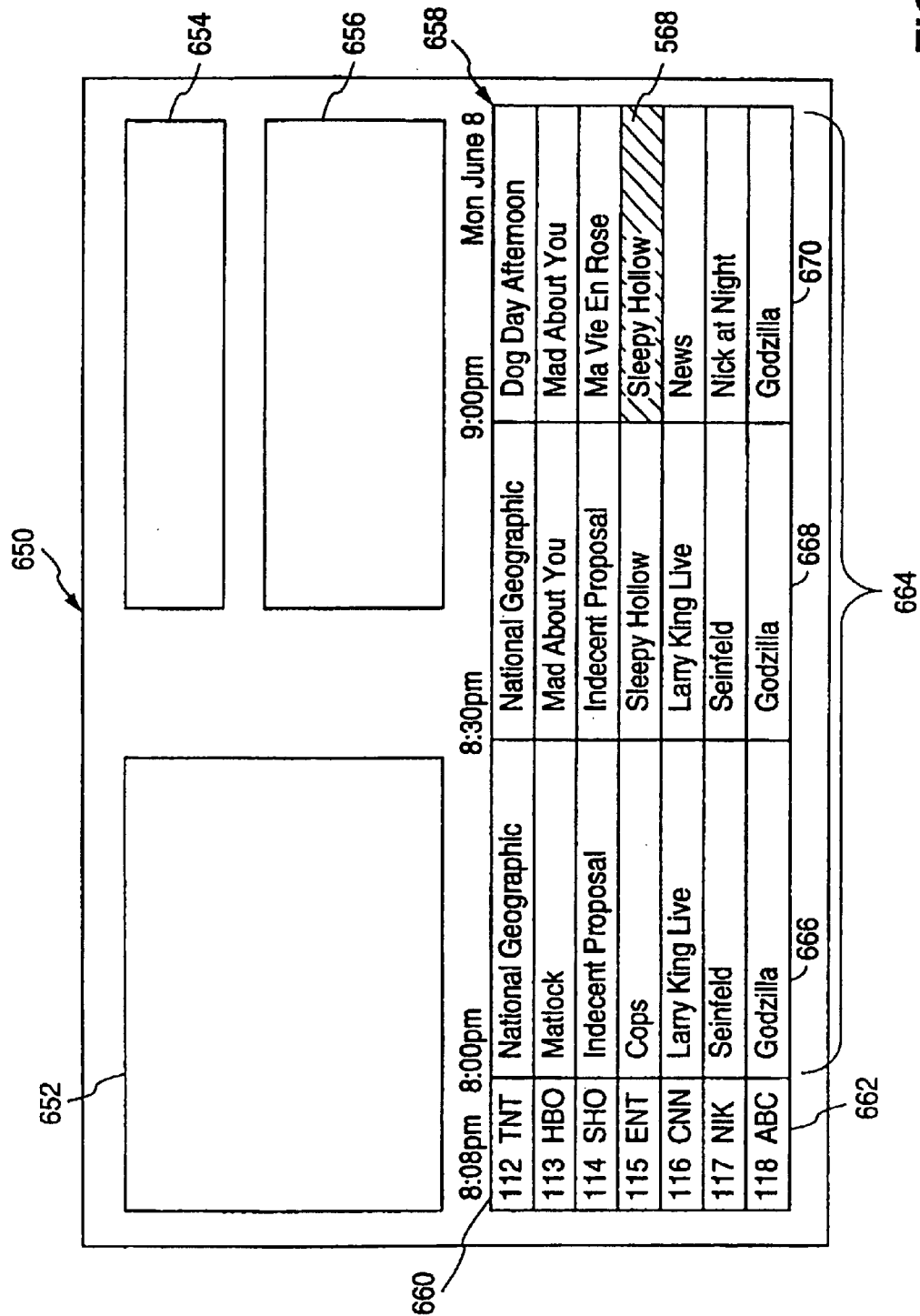

Referring now to FIG. 12, GUI Home screen 550 is shown as having "Guide" icon 552 selected by the user. As previously discussed, when the user selects "Guide" icon 552, DSS processing element 200 generates a pull-down menu having the following options: EPG 584, Station Index 586, Category 588, Alpha List 590, and Others 592. Turning now to FIGS. 13A and 13B, an EPG screen 650 is generated by DSS processing element 200 and Internet processing element 202 if the user selects EPG option 584 from the pull-down menu of FIG. 12 or selects "GUIDE" key 304 of remote controller 14. EPG screen 650 includes a decimated video region 652 that displays a selected program or graphic images corresponding to a selected program, an information region 654 that displays the channel number, channel ID, program name, program rating, and program length of the selected program, and a Display Information Packet (DIP) region 656 that displays detailed information (e.g., story line, actor names, etc . . . ) about the selected program. EPG screen 650 also includes a channel table 658 that identifies each channel by channel number 660 and channel name 662. Channel table 658 also includes a program list 664 that displays the programs being shown on each channel. Program list 664 is preferably divided into three time periods 666–670. As shown, the time periods may be half-hour intervals, however, longer or shorter time intervals are deemed within the scope of the invention. Preferably, highlight box (or cursor) 568 is positioned in the upper left corner of program list 664 when EPG screen 650 is first displayed. In operation, the user navigates through EPG screen 650 by actuating direction keys 318–324 and enter key 326 on remote controller 14. As shown in FIG. 13A, the user can view a program currently being broadcast on channel 112 by positioning highlight box (or cursor) 568 on the desired program (e.g., National Geographic) and pressing enter key 326. In response, Internet processing element 202 detects the selection of channel 112 and transmits a "tune to channel 112" command to DSS processing element 200 via buffer logic 204. DSS processing element 200, in turn, receives the "tune to channel 112" command, executes a related routine stored in ROM 216, and displays channel 112 on television 16, as discussed above in FIGS. 2A–2C. As shown in FIG. 13B, the user can also view graphic images corresponding to a program that will be broadcast in the future on channel 115 by positioning highlight box (or cursor) 568 on the desired program (e.g., Sleep Hollow) and pressing enter key 326. In response, Internet processing element 202 retrieves a video file stored in HDD 228, executes the retrieved video file, and displays the resulting graphic image on television 16. It should be noted that the video files stored in HDD 228 may be provided and periodically updated by the DSS service provider or the Internet service provider. The video files may be, but are not limited to, Joint Photographic Experts Group (JPEG) files, Graphics Interface Format (GIF) files, Motion Pictures Experts Group (MPEG) files, and Quicktime files. The graphic images displayed on television 16 may be, but are not limited to, a selected program's name or logo, still shots from the selected program, short video clips related to the selected program, or advertisements by the sponsors of the selected program.

Figure 14:
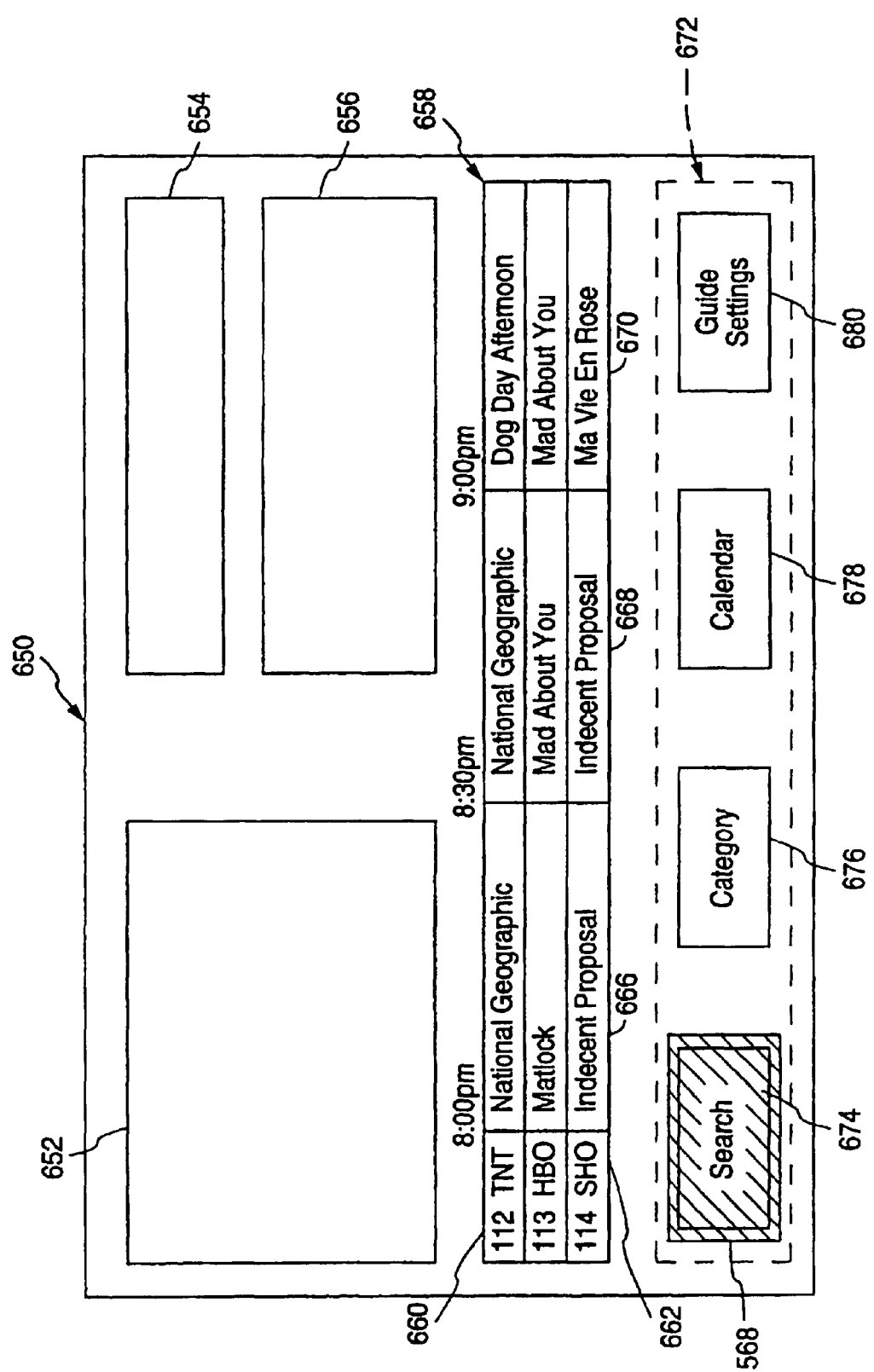
FIG. 14 illustrates an option palette displayed in the EPG of the GUI of the present invention.
Figure 15:
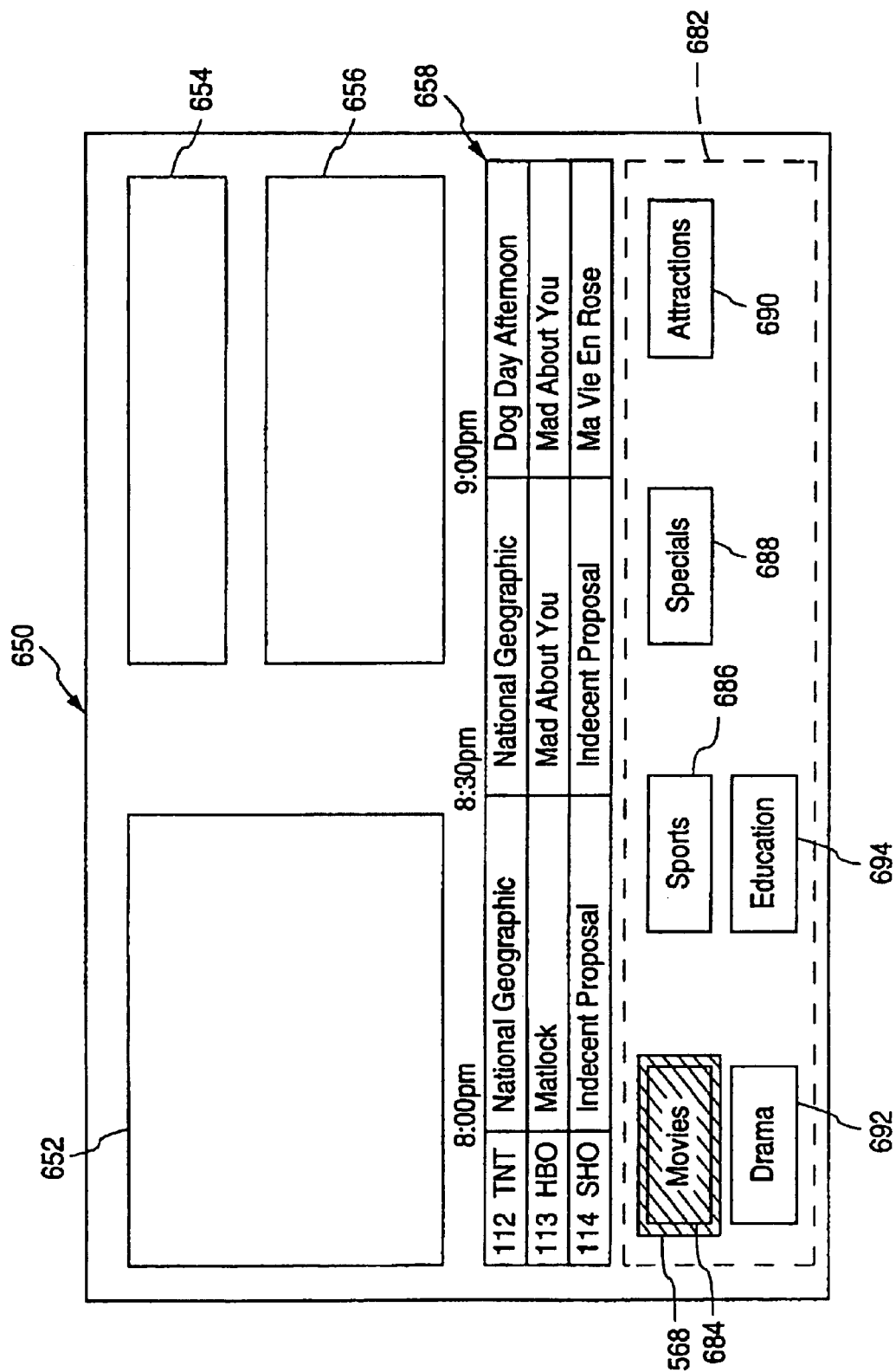
FIG. 15 illustrates the EPG of FIG. 14 after the "Category" icon is selected from the option palette in accordance with the teachings of the present invention.
Figure 16:
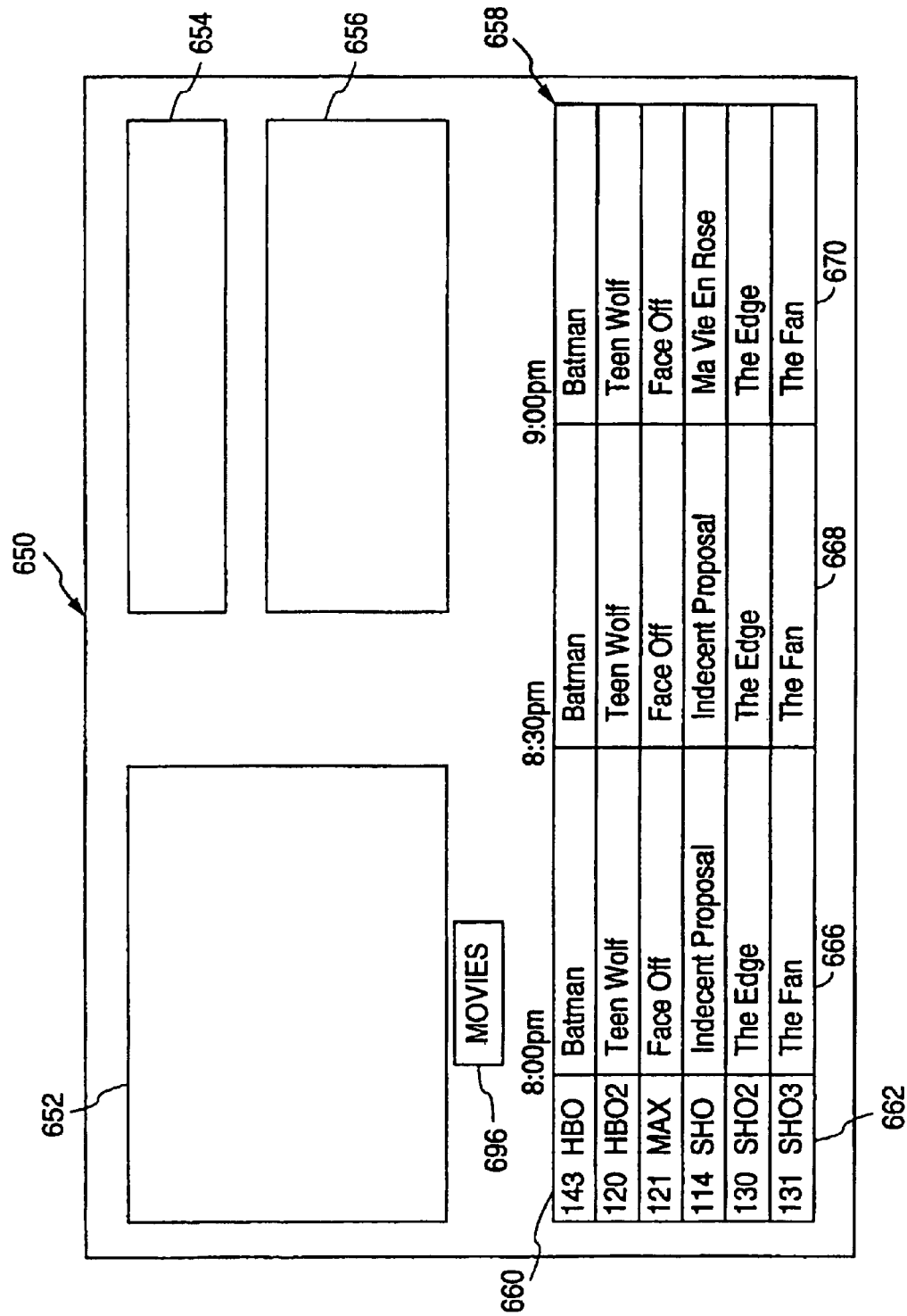
FIG. 16 illustrates the EPG of FIG. 15 after the "Movie" icon is selected in accordance with the teachings of the present invention.
Figure 17:
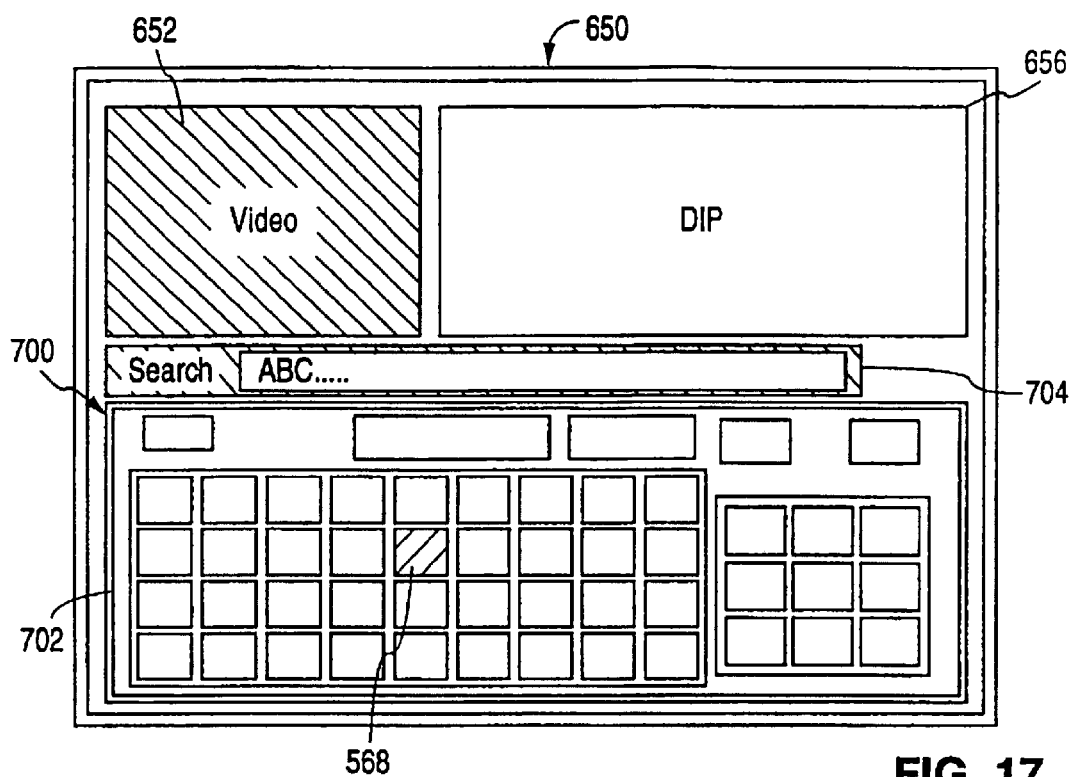
FIG. 17 illustrates the EPG of FIG. 14 after the search icon is selected in accordance with the teachings of the present invention.
Figure 18:
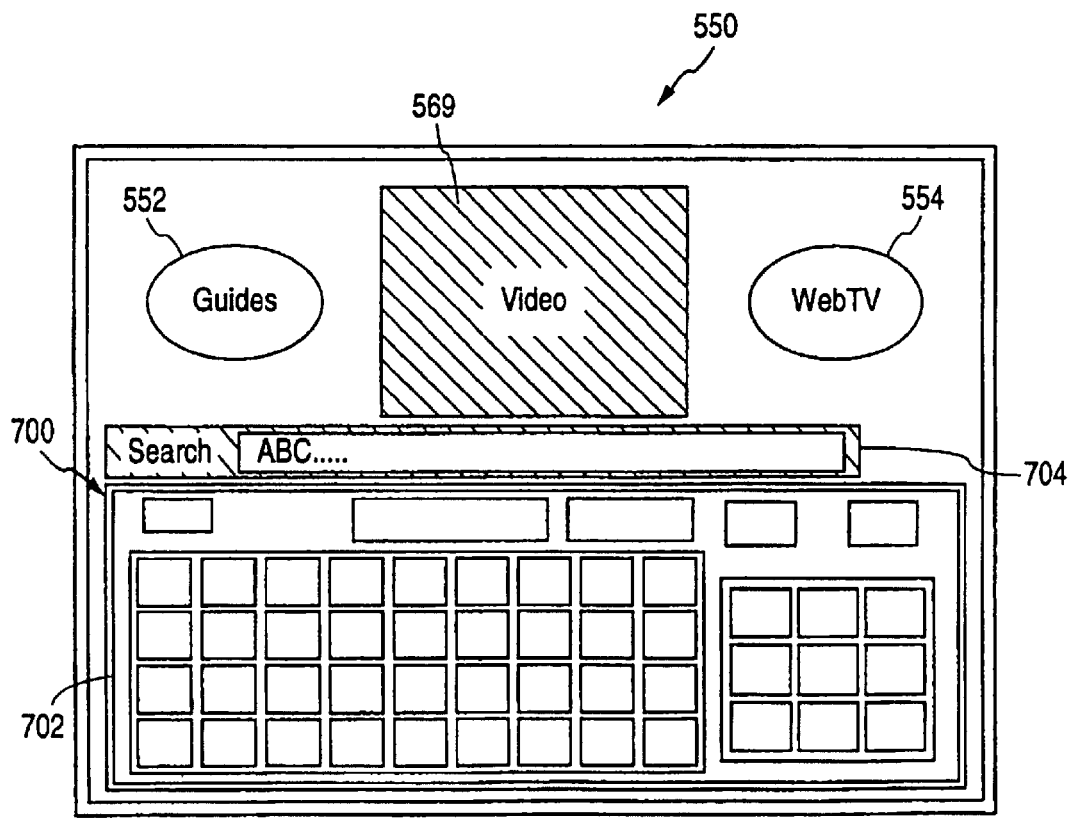
FIG. 18 illustrates the GUI home screen having a pull-up search keyboard overlaid thereon in accordance with the teachings of the present invention.
Figure 19:
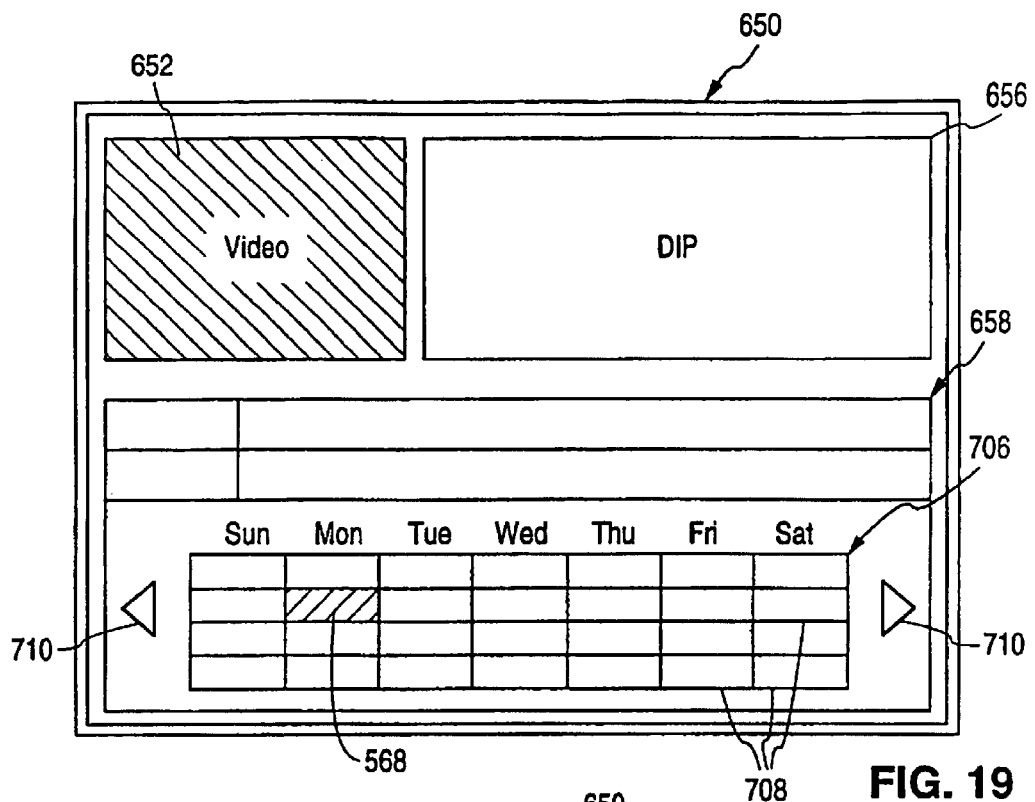
FIG. 19 illustrates the EPG of FIG. 14 after the "Calender" icon is selected from the option palette in accordance with the teachings of the present invention.
Figure 20:
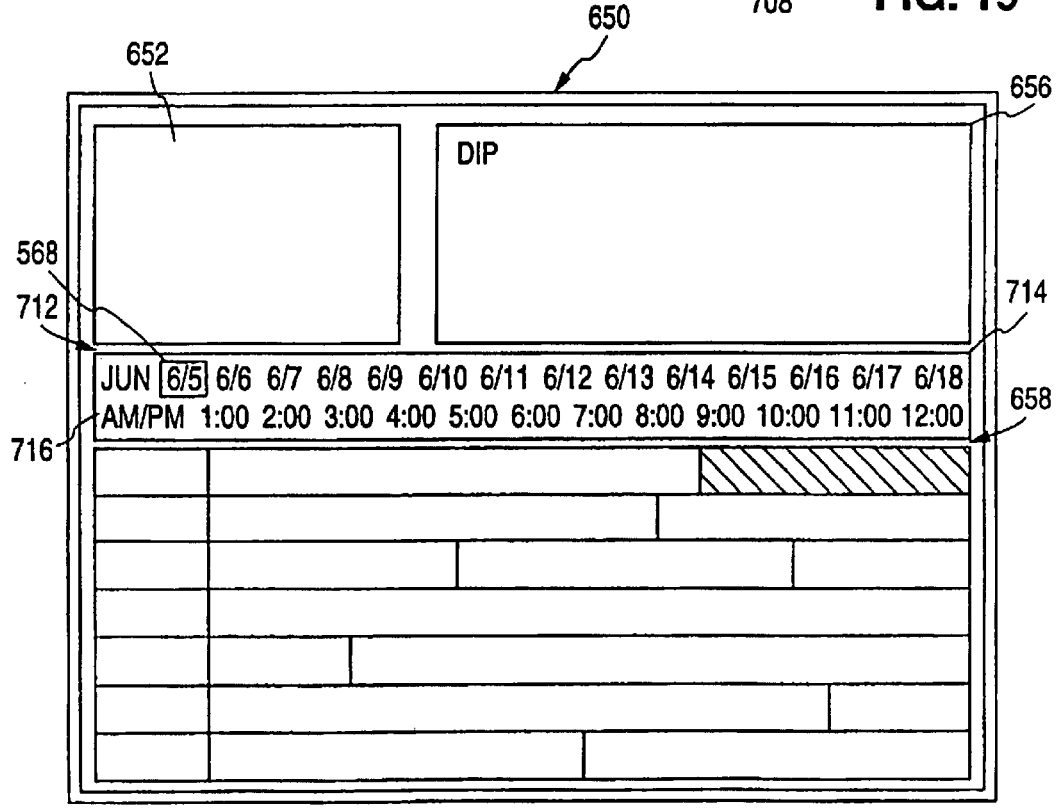
FIG. 20 illustrates an alternative embodiment of the calender feature of the present invention.

Referring now to FIG. 14, DSS processing element 200 generates an option palette 672 in EPG screen 650 if the user presses options key 312 on remote controller 14. Option palette 672 includes, but is not limited to, a "Search" icon 674, a "Category" icon 676, a "Calender" icon 678, and a "Guide Settings" icon 680. Preferably, highlight box (or cursor) 568 is positioned over "Search" icon 674 when option palette 672 is first displayed. If the user selects "Search" icon 674, DSS processing element 200 generates an on-screen keyboard, as discussed below (FIGS. 17–18). If the user selects "Category" icon 676, DSS processing element 200 generates a plurality of category icons, as discussed below (FIGS. 15–16). If the user selects "Calender" icon 678, DSS processing element 200 generates a calender screen, as discussed below (FIGS. 19–20). If the user selects "Guide Settings" icon 680, DSS processing element 200 generates a Guide Setting screen (not shown) that permits the user to alter how the EPG screen 650 operates. For example, the user can select the number of channels (and associated programs) shown in channel table 658. In addition, the user can select whether decimated video region 652 should either display a previously selected channel until the user selects a new channel or display each channel that highlight box (or cursor) 568 travels over.

Referring now to FIG. 15, a plurality of category icons 682 are generated by DSS processing element 200 if the user selects "category" icon 676 in option palette 672. Category icons 682 facilitate the user's navigation through DSS channels by filtering programs into preselected categories for presentation to the user in channel table 658. Category icons 682 include, but are not limited to, a "Movies" icon 684, a "Sports" icon 686, a "Specials" icon 688, an "Attractions" icon 690, a "Drama" icon 692, and an "Education" icon 694. Preferably, highlight box (or cursor) 568 is positioned over "Movie" icon 684 when the plurality of icons 682 are first displayed. If the user selects "Movies" icon 684, the channels that carry movies are displayed in channel table 658 (FIG. 16). If the user selects "Sports" icon 686, the channels that carry sport programs are displayed in channel table 658. If the user selects "Specials" icon 688, the channels that carry special features are displayed in channel table 658. If the user selects "Attractions" icon 690, the channels that carry upcoming attractions are displayed in channel table 658. If the user selects "Drama" icon 692, the channels that carry drama programs are displayed in channel table 658. If the user selects "Education" icon 694, the channels that carry educational programs are displayed in channel table 658.

Referring now to FIG. 16, EPG 650 is shown as having movie carrying channels displayed in channel table 658. It should be noted that when channel table 658 is only displaying a user-selected category of programs, the DSS processing element 200 causes a category identifier 696 to be presented to the user in EPG 650. Category identifier 696 reminds the user that channel table 658 is only displaying a category filtered portion of the programs offered by the DSS service provider.

Referring now to FIG. 17, an on-screen keyboard 700, generated by DSS processing element 200 and or Internet processing element 202, slides upwardly over option palette 672 and channel table 658 if the user selects "Search" icon 674 in option palette 672. On-screen keyboard 700 allows the user to search for a desired program by entering a search term (e.g., actor's name, sport team's name, movie director's name). On-screen keyboard 700 includes a plurality of keys 702 and a window 704 for displaying search terms entered by the user via keys 702. In operation, the user manipulates keys 702 of on-screen keyboard 700 via directional keys 318–324 and enter key 326 of remote controller 14. It should be noted that the user may enter search terms via keyboard peripheral 38 (FIG. 1) if keyboard peripheral 38 is connected to integrated DSS/WebTV receiver 12.

Referring now to FIG. 18, on-screen keyboard 700 can also be accessed by the user in GUI Home screen 550. If the user accesses on-screen keyboard 700 in GUI Home screen 550, the user can enter Internet search terms via on-screen keyboard 700 in the same manner as described with respect to FIG. 17.

Referring now to FIG. 19, a calender 706, generated by DSS processing element 200, is superimposed over option palette 672 and a portion of channel table 658 if the user selects "Calender" icon 678 in option palette 672. Calender 706 includes a plurality of days 708 within a predetermined time period (e.g., one month). Calender 706 permits the user to filter programs displayed in channel table 658 on a daily basis. Preferably, highlight box (or cursor) 568 is positioned over the current date in calender 706 when calender 706 is first displayed to the user. In operation, the user positions, via remote controller 14, highlight box (or cursor) 568 over a day in which the user desires to view a program listing. Afterwards, the user selects the highlighted day by pressing enter key 326 on remote controller 14. In response, the DSS processing element 200 causes a portion of the programs (e.g., three channels of programs over an hour and a half time period) shown on the selected day to be displayed in channel table 658. The user can then navigate through the selected day's programs via channel table 658, as described above. It should be noted that the user can move from predetermined time period to predetermined time period (e.g., month-to-month) by actuating arrow keys 710 via remote controller 14.

Referring now to FIG. 20, an alternative embodiment of the calender feature of the present invention is illustrated. In the alternative embodiment, a calender 712, generated by DSS processing element 200, is presented to the user when the user accesses EPG 650. Calender 712 is positioned above channel table 658 and below decimated video and DIP regions 652 and 656. Calender 712 includes a horizontal date list 714 and a horizontal time list 716. In operation, the user, via remote controller 14, selects a date from date list 714 and a time from time list 716 in order to view programs for a given date and time in program table 658. The user then navigates through the programs in program table 658, as discussed above. It should be noted that the user can horizontally scroll through calender 712 in order to display a desired date and/or time within a given time period (e.g., one month). Preferably, highlight box (or cursor) 568 is positioned over the current date in calender 712 when EPG 650 is first displayed to the user.

Figure 21:
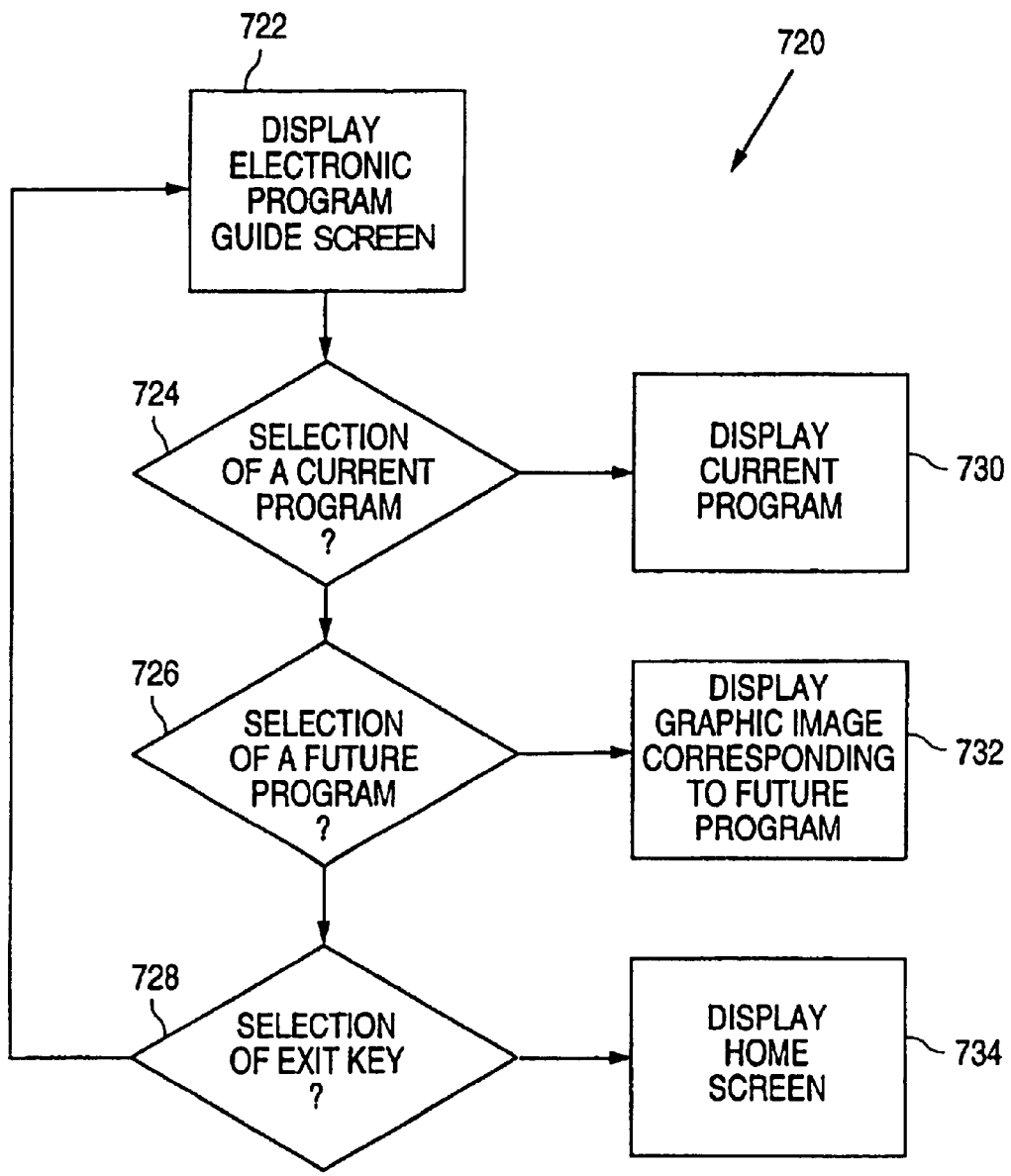
FIG. 21 is an exemplary flowchart illustrating the process of selecting programs in the EPG of FIGS. 13A and 13B.

Referring now to FIG. 21, an exemplary flowchart 720, illustrative of the user selecting a program in EPG screen 650 (FIGS. 13A and 13B), is shown. Initially, at step 722, DSS processing element 200 and Internet processing element 202 display EPG screen 650 on television 16, as discussed above. Afterwards, Internet processing element 202, at step 724, determines if the user has selected a program that is currently being broadcast by the DSS service provider. If Internet processing element 202 determines that the user has selected a currently broadcasted program, Internet processing element 202 instructs DSS processing element 200 to tune to the selected DSS channel and, at step 730, displays the currently broadcasted program on television 16. If Internet processing element 202 determines that the user has not selected a currently broadcasted program, Internet processing element 202, at step 726, determines if the user has selected a program that is going to be broadcasted by the DSS service provider in the future. If the Internet processing element 202 determines that the user has selected a program to be broadcasted in the future, Internet processing element 202, at step 732, retrieves a video file corresponding to the selected program from HDD 228, executes the video file, and displays the resultant graphic image on television 16, as discussed above (FIG. 13B). If Internet processing element 202 determines that the user has not selected a program to be broadcasted in the future, Internet processing element 202, at step 728, determines if the user has selected exit key 316 of remote controller 14. If the user has selected exit key 316, Internet processing element 202 and DSS processing element 200, at step 728, display Home screen 550 of the GUI. If the user has not selected exit key 316, Internet processing element 202 and DSS processing element 200 return to step 722 and continue to display EPG screen 650.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. An apparatus for displaying information to a user via a television, comprising:

a digital satellite system (DSS) processing element communicatively connected to a satellite communication medium for receiving a programming broadcast over the satellite communication medium;

a computer readable medium for storing a graphic image, the graphic image corresponding to a television program to be broadcast over the satellite communication medium; and an internet processing element communicatively connected to the internet for transmitting and receiving data over the internet, communicatively connected to the DSS processing element for receiving the programming from the DSS processing element, communicatively connected to the computer readable medium, for retrieving the graphic image from the computer readable medium, and communicatively connected to the television for displaying the data received from the Internet and one of the television program and the graphic image on the television, the Internet processing element displaying a graphical user interface displaying on a single display screen selectable television programs that are currently being broadcast over the satellite communication medium and selectable television programs that are to be broadcast in the future, the Internet processing element displaying the television program on the television in response to a user request for the television program if the DSS processing element has received the television program from the satellite communication medium, the Internet processing element displaying the graphic image on the television and additional textual information about the content of the television program in response to the user request for the television program if the DSS processing element has not received the television program from the satellite communication medium while not displaying any graphic images corresponding to ones of the selectable television programs that have not been requested.

2. The apparatus of claim 1, wherein the Internet processing element displays the graphical user interface on the television and initiates the display of one of the television program and the graphic image in response to the user's manipulation of the graphical user interface.

3. The apparatus of claim 2, further comprising:

a remote controller for facillitating the user's manipulation of the graphical user interface.

4. The apparatus of claim 1, wherein the Internet processing unit periodically updates the graphic image stored in the computer readable medium based on data received over the Internet.

5. The apparatus of claim 1, wherein the Internet processing unit periodically updates the graphic image stored in the computer readable medium based on data received over the satellite communication medium.

6. The apparatus of claim 1, wherein the graphic image is stored in the computer readable medium as one of JPEG file, a GIF file, a MPEG file, and a Quicktime file.

7. The apparatus of claim 1, wherein the graphic image displayed on the television is a name of the television program.

8. The apparatus of claim 1, wherein the graphic image displayed on the television is a logo of the television program.

9. The apparatus of claim 1, wherein the graphic image displayed on the television is a still shot from the television program.

10. The apparatus of claim 1, wherein the graphic image displayed on the television is a video clip of a portion of the television program.

11. The apparatus of claim 1, wherein the graphic image displayed on the television is an advertisement related to the television program.

12. A method of displaying information to a user via a television, comprising the steps of:

receiving a graphic image related to a television program to be broadcast over a satellite communication medium;

storing the graphic image in a computer readable medium;

displaying a graphical user interface on the television, the graphical user interface displaying on a single display screen selectable television programs that are currently being broadcast over the satellite communication medium and selectable television programs that are to be broadcast in the future;

receiving a user request for the television program;

displaying the graphic image on the television in the graphical user interface if the request for the television program is received before the television program is broadcasted over the satellite communication medium, while not displaying any graphic images corresponding to ones of the selectable television programs that have not been requested by the user; and displaying additional textual information about the content of the television program on the television if the request for the television program is received before the television program is broadcasted over the satellite communication medium.

13. The method of claim 12, further comprising the step of:

displaying the television program on the television if the request for the television program is received while the television program is being broadcasted over the satellite communication medium.

14. The method of claim 12, wherein the step of receiving the graphic image includes downloading the graphic image from the Internet.

15. The method of claim 12, further comprising the steps of:

periodically receiving data from the Internet; and updating the stored graphic image in accordance with the received data.

16. The method of claim 12, further comprising the steps of:

periodically receiving data from the satellite communication medium; and updating the stored graphic image in accordance with the received data.

17. The method of claim 12, further comprising the step of:

initiating the display of the graphic image in response to the user's manipulation of the graphical user interface.

18. The method of claim 17, further comprising the step of:

providing a remote controller for facilitating the user's manipulation of the graphical user interface.

19. The method of claim 12, wherein the graphic image is stored in the computer readable medium as one of a JPEG file, a GIF file, a MPEG file, and a Quicktime file.

20. The method of claim 12, wherein the graphic image displayed on the television is a name of the television program.

21. The method of claim 12, wherein the graphic image displayed on the television is a logo of the television program.

22. The method of claim 12, wherein the graphic image displayed on the television is a still shot from the television program.

23. The method of claim 12, wherein the graphic image displayed on the television is a video clip of a portion of the television program.

24. The method of claim 12, wherein the graphic image displayed on the television is an advertisement related to the television program.

25. An apparatus for displaying information to a user via a television, comprising:

means for receiving a graphic image related to a television program to be broadcast over a satellite communication medium;

means for storing the graphic image in a computer readable medium;

means for displaying a graphical user interface on the television, the graphical user interface displaying on a single display screen selectable television programs that are currently being broadcast over the satellite communication medium and selectable television programs that are to be broadcast in the future on a single display screen;

means for receiving a user request for the television program;

means for displaying the graphic image on the television in the graphical user interface if the request for the television program is received before the television program is broadcasted over the satellite communication medium, while not displaying any graphic images corresponding to ones of the selectable television programs that have not been requested by the user; and displaying additional textual information about the content of the television program on the television if the request for the television program is received before the television program is broadcasted over the satellite communication medium.

26. The apparatus of claim 25, further comprising:

means for displaying the television program on the television if the request for the television program is received while the television program is being broadcasted over the satellite communication medium.

27. The apparatus of claim 25, wherein in the means for receiving the graphic image includes means for downloading the graphic image from the internet.

28. The apparatus of claim 25, further comprising:

means for periodically receiving data from the Internet; and means for updating the stored graphic image in accordance with the received data.

29. The apparatus of claim 25, further comprising:

means for periodically receiving data from the satellite communication medium; and means for updating the stored graphic image in accordance with the received data.

30. The apparatus of claim 25, further comprising:

means for initiating the display of the graphic image in response to the user's manipulation of the graphical user interface.

31. The apparatus of claim 30, further comprising:

a remote controller for facilitating the user's manipulation of the graphical user interface.

32. The apparatus of claim 25, wherein the graphic image is stored in the computer readable medium as one of a JPEG file, a GIF file, a MPEG file, and a Quicktime file.

33. The apparatus of claim 25, wherein the graphic image displayed on the television is a name of the television program.

34. The apparatus of claim 25, wherein the graphic image displayed on the television is a logo of the television program.

35. The apparatus of claim 25, wherein the graphic image displayed on the television is a still shot from the television program.

36. The apparatus of claim 25, wherein the graphic image displayed on the television is a video clip of a portion of the television program.

37. The apparatus of claim 25, wherein the graphic image displayed on television is an advertisement related to the television program.

38. The apparatus of claim 1, wherein the Internet processing element displays the selectable television programs for different time periods on the side display screen of the graphical user interface.

39. The apparatus of claim 1 wherein the additional information is displayed on a different portion of the display than a portion for displaying the graphic image.

40. The method of claim 12, further comprising the steps of:
   positioning an indicator on a portion of the graphical user interface corresponding to the television program in order to highlight the television program; and
   requesting, after the positioning step, the television program.

41. The method of claim 12, wherein the graphical user interface displays the selectable television programs for different time periods on the single display screen of the graphical user interface.

42. The method of claim 12 wherein the additional information is displayed on a different portion of the display than a portion for displaying the graphic image.

43. The apparatus of claim 25, wherein the graphical user interface displays the selectable television programs for different time periods on the single display screen of the graphical user interface.

44. The apparatus of claim 1, wherein the graphic image is received from a medium independent of the satellite communication medium.

45. The method of claim 12, wherein the step of storing the graphic image includes downloading the graphic image from the satellite communication medium.

46. The method of claim 12, wherein the graphic image is received from a medium independent of the satellite communication medium.

47. The apparatus of claim 25, wherein the means for storing the graphic image includes means for downloading the graphic image from the satellite communication medium.

48. The apparatus of claim 25, wherein the graphic image is received from a medium independent of the satellite communication medium.

49. The apparatus of claim 1 wherein the Internet processing element displays the graphic image on the television in response to the user request for the television program if the DSS processing element has not received the television program from the satellite communication medium, the television program highlighted in a graphical user interface displayed on the television prior to the user request for the television program.

50. The method of claim 12 further comprising:
   receiving an indication that the television program has been highlighted in the graphical user interface prior to the step of receiving the user request.

51. The apparatus of claim 25 further comprising:
   means for receiving an indication that the television program has been highlighted in the graphical user interface; and
   wherein the means for receiving the user request comprise:
   means for receiving the user request for the television program having been highlighted.

52. The apparatus of claim 1 wherein the computer readable medium is located in a receiver unit containing the digital satellite system processing element and the Internet processing element.

53. The method of claim 12 wherein the storing step comprises:
   storing the graphic image in the computer readable medium of a receiver unit coupled to the television.

54. The apparatus of claim 25 wherein the means for storing comprises:
   means for storing the graphic image in the computer readable medium of a receiver unit coupled to the television.

55. The apparatus of claim 1 wherein the graphic Image is stored prior to the broadcasting of the television program and prior to a request for the television program.

56. The method of claim 12 wherein the receiving and storing steps comprise receiving and storing the graphic Image prior to the broadcasting of the television program and prior to a request for the television program.

57. The apparatus of claim 25 wherein the means for receiving and storing comprise means for receiving and storing the graphic image prior to the broadcasting of the television program and prior to a request for the television program.

58. A method of displaying information to a user via a television, comprising the steps of:
   receiving a graphic image related to a television program to be broadcast over a communication medium, the graphic image received prior to the broadcasting of the television program and prior to a request for the television program in an electronic program guide;
   storing the graphic image in a memory of a local television receiver unit coupled to the television;
   displaying the electronic program guide on the television, the electronic program guide displaying selectable television programs that are currently being broadcast and selectable television programs that are to be broadcast in the future in a first portion of a single display screen of the electronic program guide;
   receiving a user request for the television program in the electronic program guide;
   displaying additional textual information about the content of the television program in a second portion of the single display screen of the electronic program guide on the television; and
   in the event that the request for the television program is received before the television program is broadcasted over the communication medium, displaying the graphic image on the television in a third portion of the single display screen of the electronic program guide while not displaying any graphic images corresponding to ones of the selectable television programs that have not been requested by the user;
   in the event that the request for the television program is received when the television program is being broadcast over the communication medium, displaying the television program in the third portion of the single display screen of the electronic program guide.

* * * * *

UNITED STATES PATENT AND TRADEMARK OFFICE
CERTIFICATE OF CORRECTION

| | | |
|---|---|---|
| PATENT NO. | : 6,990,676 B1 | |
| APPLICATION NO. | : 09/271028 | |
| DATED | : January 24, 2006 | |
| INVENTOR(S) | : Proehl et al. | |

It is certified that error appears in the above-identified patent and that said Letters Patent is hereby corrected as shown below:

Claim 1, column 17, line 51, after "receiving" delete "a".

Claim 38, column 21, line 1, change "side" to --single--.

Claim 55, column 22, line 12, change "Image" to --image--.

Claim 56, column 22, line 17, change "Image" to --image--.

Signed and Sealed this

First Day of August, 2006

JON W. DUDAS
*Director of the United States Patent and Trademark Office*